US012115131B2

(12) United States Patent
Paz

(10) Patent No.: US 12,115,131 B2
(45) Date of Patent: Oct. 15, 2024

(54) LOCKABLE ADVANCEABLE ORAL DOSAGE FORM DISPENSER CONTAINERS

(71) Applicant: DOSENTRX LTD., Beit Shemesh (IL)

(72) Inventor: Ilan Paz, Alon Shvut (IL)

(73) Assignee: Dosentrx Ltd., Bet Shemesh (IL)

( * ) Notice: Subject to any disclaimer, the term of this patent is extended or adjusted under 35 U.S.C. 154(b) by 106 days.

(21) Appl. No.: 17/959,200

(22) Filed: Oct. 3, 2022

(65) Prior Publication Data

US 2023/0233412 A1 Jul. 27, 2023

Related U.S. Application Data

(62) Division of application No. 15/773,138, filed as application No. PCT/IL2016/051178 on Nov. 1, 2016, now Pat. No. 11,458,072.

(Continued)

(51) Int. Cl.

| | |
|---|---|
| ***A61J 7/00*** | (2006.01) |
| ***A61J 1/03*** | (2023.01) |
| ***B65D 83/04*** | (2006.01) |

(52) U.S. Cl.

CPC ............ *A61J 7/0076* (2013.01); *A61J 1/035* (2013.01); *B65D 83/0463* (2013.01)

(58) Field of Classification Search

CPC ..... A61J 7/0076; A61J 1/035; B65D 83/0463; A61B 5/117; G16H 40/67; G16H 40/63; G16H 20/13; G06F 15/76

(Continued)

(56) References Cited

U.S. PATENT DOCUMENTS

| | | |
|---|---|---|
| 38,343 A | 4/1863 | Tower |
| 708,216 A | 9/1902 | Fowler, Jr. |

(Continued)

FOREIGN PATENT DOCUMENTS

| | | | |
|---|---|---|---|
| FR | 2538791 | 7/1984 | |
| FR | 2538791 A1 * | 7/1984 | ......... B65D 83/0463 |

(Continued)

*Primary Examiner* — Rakesh Kumar

(74) *Attorney, Agent, or Firm* — Armstrong Teasdale LLP

(57) ABSTRACT

This invention provides a blister pack dosage form container, comprising an advanceable blister pack holder, comprising a series of access portals sized to accommodate pass-through of at least one dosage form contained within a multi-dosage form containing blister pack located within said holder proximally therethrough upon engagement of an appropriate depilling structure, wherein said advanceable blister pack holder optionally accommodates upright positioning of said dosage forms and said depilling structure displaces said dosage form laterally. The invention also provides a multi-dosage form container, comprising an advanceable multi-sectioned dosage form holder, comprising a series of access portals sized to accommodate pass-through of at least one dosage form contained within said multi-sectioned dosage form holder proximally therethrough upon alignment with an appropriate egress structure, optionally wherein said multi-sectioned dosage form holder accommodates upright positioning of said dosage forms such that said egress structure provides for lateral displacement of said at least one dosage form; and a lockable outer container, comprising a tamper proof casing within which the multi-sectioned dosage form holder is contained. Kits containing the blister pack dosage form container and multi-dosage form containers are also described.

24 Claims, 12 Drawing Sheets

Related U.S. Application Data

(60) Provisional application No. 62/249,373, filed on Nov. 2, 2015.

(58) Field of Classification Search
USPC ................ 206/531; 700/237; 221/25, 88, 69
See application file for complete search history.

(56) References Cited

U.S. PATENT DOCUMENTS 1,187,634 A 6/1916 Lorimer et al.
2,004,243 A 6/1935 Hloch
2,470,298 A 5/1949 Fields
2,510,712 A 6/1950 Dlowinski
2,526,749 A 10/1950 Hokanson
2,694,641 A 11/1954 Atwood
2,740,558 A 4/1956 Steele
2,963,200 A 12/1960 Miller
3,150,639 A 9/1964 Sereda
3,270,918 A 9/1966 Burch et al.
RE26,589 E 5/1969 Murov et al.
3,904,075 A 9/1975 Richardson et al.
3,923,060 A 12/1975 Ellinwood, Jr.
4,106,698 A 8/1978 Lin
4,114,965 A 9/1978 Dye et al.
4,695,954 A 9/1987 Rose et al.
4,784,288 A * 11/1988 Jennings .............. B65D 47/283 206/536
4,839,806 A 6/1989 Goldfischer et al.
4,887,594 A 12/1989 Siegel
4,915,256 A 4/1990 Tump
4,918,690 A 4/1990 Markkula, Jr.
5,049,125 A 9/1991 Accaries et al.
5,110,008 A 5/1992 Moulding et al.
5,163,426 A 11/1992 Czeisler et al.
5,176,133 A 1/1993 Czeisler et al.
5,219,093 A 6/1993 Moulding et al.
5,344,043 A 9/1994 Moulding et al.
5,431,299 A 7/1995 Brewer et al.
5,460,299 A 10/1995 Prause
5,464,118 A 11/1995 Grau et al.
5,475,687 A 12/1995 Markkula, Jr. et al.
5,490,610 A 2/1996 Pearson
5,524,073 A 6/1996 Stambler
5,562,232 A 10/1996 Pearson
5,570,810 A 11/1996 Lambelet et al.
5,844,888 A 12/1998 Markkula, Jr.
5,850,937 A 12/1998 Rauche
5,853,244 A 12/1998 Hoff et al.
5,921,395 A 7/1999 Alexander
5,955,952 A 9/1999 Bergman et al.
6,032,155 A 2/2000 De La
6,048,271 A 4/2000 Barcelou
6,062,420 A 5/2000 Krouwel et al.
6,068,126 A 5/2000 Dejonge
6,098,835 A 8/2000 Dejonge
6,150,942 A 11/2000 O'Brien et al.
6,152,364 A 11/2000 Schoonen et al.
6,163,736 A * 12/2000 Halfacre ............... A61J 7/0481 221/185
6,193,103 B1 2/2001 Clarijs
6,219,587 B1 4/2001 Ahlin et al.
6,263,259 B1 7/2001 Bartur
6,318,051 B1 11/2001 Preiss
6,327,570 B1 12/2001 Stevens
6,352,200 B1 3/2002 Schoonen et al.
6,415,202 B1 * 7/2002 Halfacre ............... A61J 7/0481 221/185
6,579,231 B1 6/2003 Phipps
6,601,729 B1 8/2003 Papp
6,604,019 B2 8/2003 Ahlin et al.
6,611,733 B1 8/2003 De La
6,651,840 B1 11/2003 Dullemen et al.
6,729,327 B2 5/2004 McFarland, Jr. et al.
6,776,304 B2 8/2004 Liff et al.
6,814,255 B2 11/2004 Liff et al.
6,848,593 B2 2/2005 Papp
6,892,941 B2 5/2005 Rosenblum
6,922,664 B1 7/2005 Fernandez et al.
6,947,900 B2 9/2005 Giordano, III et al.
6,988,634 B2 1/2006 Varis
7,006,894 B2 2/2006 De La
7,084,946 B2 8/2006 Dta et al.
7,104,417 B2 * 9/2006 Hilliard .............. B65D 83/0454 221/25
7,147,127 B2 12/2006 Lepke et al.
7,178,688 B2 2/2007 Naufel et al.
7,216,776 B2 5/2007 Gelardi
7,216,802 B1 5/2007 De La Huerga
7,231,920 B2 6/2007 Harvey et al.
7,249,687 B2 7/2007 Anderson
7,302,311 B2 11/2007 Varis
7,426,475 B1 9/2008 Tangellapally et al.
7,451,761 B2 11/2008 Hickey et al.
7,491,219 B2 2/2009 Steinberg
7,503,081 B2 3/2009 Montgomery
7,543,718 B2 6/2009 Simon
7,624,733 B2 12/2009 Riley et al.
7,624,894 B2 12/2009 Gerold et al.
7,637,079 B2 12/2009 Klingel et al.
7,654,261 B1 2/2010 Rockhold
7,665,811 B2 2/2010 Johanning
7,677,941 B2 3/2010 Koyama
7,692,195 B2 4/2010 Namose
7,704,236 B2 4/2010 Denolly
7,727,469 B2 6/2010 Takahashi et al.
7,766,365 B2 8/2010 Darling, III
7,771,984 B2 8/2010 Dzekunov et al.
7,787,986 B2 8/2010 Pinney et al.
7,844,362 B2 11/2010 Handfield et al.
7,860,724 B2 12/2010 Chudy et al.
7,865,263 B2 1/2011 Spano, Jr. et al.
7,885,725 B2 2/2011 Dunn
7,930,056 B2 4/2011 Fernandez
7,932,832 B2 4/2011 Hayashi
7,934,355 B2 5/2011 Strub et al.
7,946,483 B2 5/2011 Miller et al.
7,978,083 B2 7/2011 Melker et al.
7,988,016 B2 8/2011 Klein et al.
7,996,106 B2 8/2011 Ervin
7,999,987 B2 8/2011 Namose
8,006,903 B2 8/2011 Braun
8,015,417 B2 9/2011 Kato et al.
8,027,748 B2 9/2011 Handfield et al.
8,032,397 B2 10/2011 Lawless
8,065,035 B2 11/2011 Ross et al.
8,073,563 B2 12/2011 Vahlberg et al.
8,090,473 B2 1/2012 Higham
8,103,346 B2 1/2012 Mass et al.
8,103,379 B2 1/2012 Biba et al.
8,112,942 B2 2/2012 Bohm et al.
8,118,222 B2 2/2012 Barcelou
8,126,590 B2 2/2012 Vahlberg et al.
8,135,497 B2 3/2012 Joslyn
8,140,186 B2 3/2012 Vahlberg et al.
8,145,353 B1 3/2012 Cotner
8,162,690 B2 4/2012 Smith
8,195,329 B2 6/2012 Pinney et al.
8,265,757 B2 9/2012 Mass et al.
8,266,447 B2 9/2012 Volkening et al.
8,280,550 B2 10/2012 Levy et al.
8,343,434 B2 1/2013 Hyde et al.
8,390,761 B2 3/2013 Oda
8,395,314 B2 3/2013 Yamamoto et al.
8,417,378 B2 4/2013 Joslyn
8,478,604 B2 7/2013 Henderson et al.
8,494,878 B2 7/2013 Stevens
8,504,197 B2 8/2013 Farr
8,554,365 B2 10/2013 Thomas et al.
8,579,116 B2 11/2013 Pether et al.
8,587,427 B2 11/2013 Lalonde et al.
8,615,971 B2 12/2013 Freudelsperger
8,626,342 B2 1/2014 Williams
8,672,879 B2 3/2014 Grant et al.
8,725,291 B2 5/2014 Czaja et al.

(56) References Cited

U.S. PATENT DOCUMENTS 8,787,555 B2 7/2014 Gonen et al.
8,926,526 B2 1/2015 Shuck
8,930,207 B2 1/2015 Keravich et al.
8,954,190 B2 2/2015 Braunstein
9,014,847 B2 4/2015 Dunn
9,031,690 B2 5/2015 Cotner
9,037,616 B2 5/2015 Bessette
9,043,012 B2 5/2015 Davey et al.
9,098,983 B2 8/2015 Rahilly
9,107,571 B2 8/2015 Strauss et al.
9,111,408 B2 8/2015 Biba et al.
9,185,501 B2 11/2015 Pai
9,211,498 B2 12/2015 Akdogan et al.
9,235,689 B2 1/2016 Ervin
9,242,043 B2 1/2016 Ludolph
9,245,305 B2 1/2016 Wellington et al.
9,358,499 B2 6/2016 Akdogan et al.
9,358,500 B2 6/2016 Akdogan et al.
9,361,748 B2 6/2016 Cunningham et al.
9,381,311 B2 7/2016 Holakovsky et al.
9,400,873 B2 7/2016 Kamen et al.
9,443,062 B2 9/2016 Long et al.
9,456,959 B2 10/2016 Reddy et al.
9,463,412 B2 10/2016 Akdogan et al.
9,465,919 B2 10/2016 Kamen et al.
9,508,935 B2 11/2016 Watanabe
9,550,031 B2 1/2017 Van Sickle et al.
9,561,324 B2 2/2017 Estes
9,600,635 B2 3/2017 Czaja
9,665,689 B2 5/2017 O'Brien et al.
9,675,523 B2 6/2017 Ducatt et al.
9,707,358 B2 7/2017 Eggert et al.
9,730,005 B2 8/2017 Pai
10,292,906 B1 5/2019 Gershoni et al.
10,335,349 B2 7/2019 Roslyakov et al.
10,441,511 B2 10/2019 Hamilton
11,458,072 B2 10/2022 Paz
2002/0026332 A1 2/2002 Snowden et al.
2002/0034978 A1 3/2002 Legge et al.
2002/0088825 A1 7/2002 Laverdure
2002/0165641 A1 11/2002 Manalang et al.
2003/0115082 A1 6/2003 Jacobsen et al.
2003/0121930 A1* 7/2003 Layer .................. G07F 17/0092 221/25
2003/0216625 A1 11/2003 Phipps
2004/0019502 A1 1/2004 Leaman
2004/0045858 A1 3/2004 Harrold
2004/0073454 A1 4/2004 Urquhart et al.
2004/0077937 A1 4/2004 Yarden
2004/0099561 A1 5/2004 Christensen et al.
2004/0139000 A1 7/2004 Amos
2004/0158350 A1 8/2004 Ostergaard et al.
2004/0158507 A1 8/2004 Meek et al.
2004/0244794 A1 12/2004 Richards
2004/0249250 A1 12/2004 McGee et al.
2004/0256406 A1 12/2004 Allen
2005/0043965 A1 2/2005 Heller et al.
2005/0211768 A1 9/2005 Stillman
2006/0125356 A1 6/2006 Meek, Jr. et al.
2006/0154642 A1 7/2006 Scannell, Jr.
2006/0184524 A1 8/2006 Pollanz
2006/0194075 A1 8/2006 Miyamoto et al.
2006/0204922 A1 9/2006 Anderson et al.
2007/0042488 A1 2/2007 Bornemann
2007/0051072 A1 3/2007 Lai
2007/0104731 A1 5/2007 Kelleher et al.
2007/0185614 A1 8/2007 Bain
2007/0197978 A1 8/2007 Wortham
2007/0213877 A1 9/2007 Hart et al.
2007/0222554 A1 9/2007 Hart
2007/0261985 A1 11/2007 Allen
2008/0004507 A1 1/2008 Williams et al.
2008/0083773 A1 4/2008 Micinski
2008/0179387 A1 7/2008 Cantlay et al.
2008/0189173 A1 8/2008 Bakar et al.
2008/0251551 A1 10/2008 Huber et al.
2008/0283542 A1 11/2008 Lanka et al.
2009/0024248 A1 1/2009 Hodson
2009/0055223 A1 2/2009 Jung et al.
2009/0073356 A1 3/2009 Moriyama et al.
2009/0079335 A1 3/2009 Mitsuya et al.
2009/0134368 A1 5/2009 Shibatani et al.
2009/0135120 A1 5/2009 Shibatani
2009/0135349 A1 5/2009 Shibatani et al.
2009/0152514 A1 6/2009 Takiguchi et al.
2009/0152516 A1 6/2009 Shibatani et al.
2009/0152518 A1 6/2009 Takiguchi et al.
2009/0185114 A1 7/2009 Takiguchi
2009/0189128 A1 7/2009 Takiguchi et al.
2009/0230164 A1 9/2009 Freeman
2009/0240528 A1 9/2009 Bluth
2009/0299522 A1 12/2009 Savir et al.
2009/0302048 A1 12/2009 Nobilet et al.
2010/0005445 A1 1/2010 Argue et al.
2010/0016746 A1 1/2010 Hampton et al.
2010/0041056 A1 2/2010 Kinnon et al.
2010/0059471 A1* 3/2010 Pehr .................. B65D 47/0838 215/201
2010/0205009 A1 8/2010 Kostoff
2010/0237338 A1 9/2010 Yamamoto et al.
2010/0250697 A1 9/2010 Hansen et al.
2010/0294927 A1 11/2010 Nelson et al.
2010/0305750 A1* 12/2010 Conley ................. A61J 7/0445 235/381
2010/0312137 A1 12/2010 Gilmour et al.
2011/0014351 A1 1/2011 Reider et al.
2011/0130635 A1 6/2011 Ross
2011/0173028 A1 7/2011 Bond
2011/0190635 A1 8/2011 Bosler
2011/0270442 A1 11/2011 Conley et al.
2012/0003928 A1 1/2012 Geboers
2012/0066097 A1 3/2012 Amos
2012/0160863 A1 6/2012 Thompson et al.
2013/0018356 A1 1/2013 Prince
2013/0027206 A1 1/2013 Kosted
2013/0046276 A1 2/2013 Mernoe et al.
2013/0070090 A1 3/2013 Bufalini et al.
2013/0090744 A1 4/2013 Iran
2013/0104284 A1 5/2013 Kantrowitz et al.
2013/0151267 A1 6/2013 Mehdizadeh et al.
2013/0173302 A1 7/2013 Hyde et al.
2013/0231954 A1 9/2013 Bryant
2013/0234855 A1 9/2013 Knighton
2013/0290115 A1 10/2013 Leoni et al.
2013/0297068 A1 11/2013 Marshall
2013/0310664 A1 11/2013 Kozloski et al.
2013/0317835 A1 11/2013 Mathew
2014/0177825 A1 6/2014 Mattsson et al.
2014/0277136 A1 9/2014 Stein
2014/0320289 A1 10/2014 Raichman
2015/0057574 A1 2/2015 Baym et al.
2015/0058041 A1 2/2015 Ervin
2015/0081330 A1 3/2015 Mann et al.
2015/0148943 A1 5/2015 Sullivan
2015/0374441 A1 12/2015 Machado et al.
2016/0012445 A1 1/2016 Villa-Real
2016/0066855 A1 3/2016 Hyde et al.
2016/0089303 A1 3/2016 Latorraca et al.
2016/0089491 A1 3/2016 Smith
2016/0158465 A1 6/2016 Coats et al.
2016/0210439 A1 7/2016 Hartlaub et al.
2016/0259183 A1 9/2016 Rayner
2016/0267229 A1 9/2016 High et al.
2016/0283691 A1 9/2016 Ali
2016/0314272 A1 10/2016 Braustein
2016/0331641 A1 11/2016 Longley et al.
2016/0346056 A1 12/2016 Demers et al.
2016/0350500 A1 12/2016 Benja-Athon
2016/0354284 A1 12/2016 Liou et al.
2016/0367188 A1 12/2016 Malik et al.
2016/0367421 A1 12/2016 Ead
2016/0374902 A1 12/2016 Govindasamy
2017/0020785 A1 1/2017 McCullough
2017/0032092 A1 2/2017 Mink et al.

(56) References Cited

U.S. PATENT DOCUMENTS

| | | | | |
|---|---|---|---|---|
| 2017/0043896 | A1 | 2/2017 | Fernandez | |
| 2017/0172846 | A1* | 6/2017 | Wagner | A61J 1/035 |
| 2017/0231870 | A1 | 8/2017 | Stachler et al. | |
| 2019/0201293 | A1 | 7/2019 | Brady et al. | |
| 2020/0121560 | A1* | 4/2020 | Thomas | B65D 83/0454 |
| 2021/0369563 | A1* | 12/2021 | Gilson | A61J 7/0472 |
| 2023/0233412 | A1* | 7/2023 | Paz | B65D 83/0463<br>221/69 |

FOREIGN PATENT DOCUMENTS

| | | | |
|---|---|---|---|
| JP | 2006052019 | 2/2006 | |
| WO | 1992020455 | 11/1992 | |
| WO | 1996013790 | 5/1996 | |
| WO | 199910830 | 3/1999 | |
| WO | 0009419 | 2/2000 | |
| WO | WO-0009419 A2 * | 2/2000 | A61J 7/04 |
| WO | 2000064754 | 11/2000 | |
| WO | 2001067345 | 9/2001 | |
| WO | 2001076460 | 10/2001 | |
| WO | 2002071955 | 9/2002 | |
| WO | 2002095645 | 11/2002 | |
| WO | 2003040686 | 5/2003 | |
| WO | 2005109119 | 11/2005 | |
| WO | 2007070570 | 6/2007 | |
| WO | 2009036316 | 3/2009 | |
| WO | 2009125267 | 10/2009 | |
| WO | WO-2009125267 A1 * | 10/2009 | B65D 83/0463 |
| WO | 2010008377 | 1/2010 | |
| WO | 2011002319 | 1/2011 | |
| WO | 2011055040 | 5/2011 | |
| WO | 2011151056 | 12/2011 | |
| WO | 2012040528 | 3/2012 | |
| WO | 2012066580 | 5/2012 | |
| WO | 2012069896 | 5/2012 | |
| WO | 2012098248 | 7/2012 | |
| WO | 2012098249 | 7/2012 | |
| WO | 2014059310 | 4/2014 | |
| WO | 2014144548 | 9/2014 | |
| WO | 2015016375 | 2/2015 | |
| WO | 2015113149 | 8/2015 | |
| WO | 2015117049 | 8/2015 | |
| WO | 2015196293 | 12/2015 | |
| WO | 2016030902 | 3/2016 | |
| WO | 2016103256 | 6/2016 | |
| WO | 2016137186 | 9/2016 | |
| WO | 2016155970 | 10/2016 | |
| WO | 2016181014 | 11/2016 | |
| WO | 2016189497 | 12/2016 | |
| WO | 2016196102 | 12/2016 | |
| WO | 2017055728 | 4/2017 | |

* cited by examiner

Fig.2C
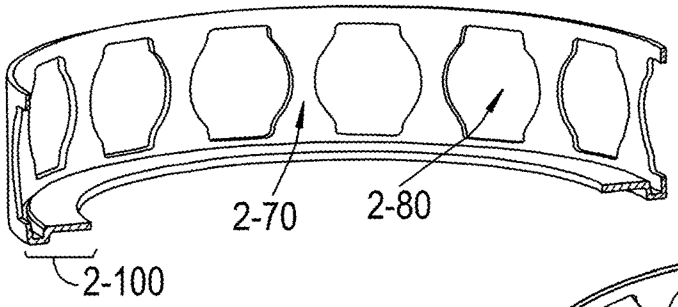
Fig.2D
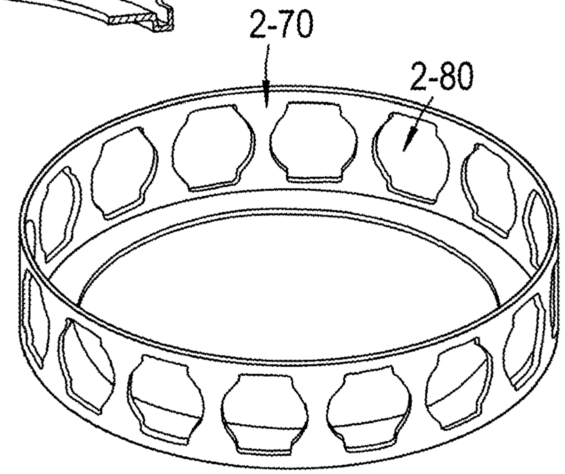
Fig.3A
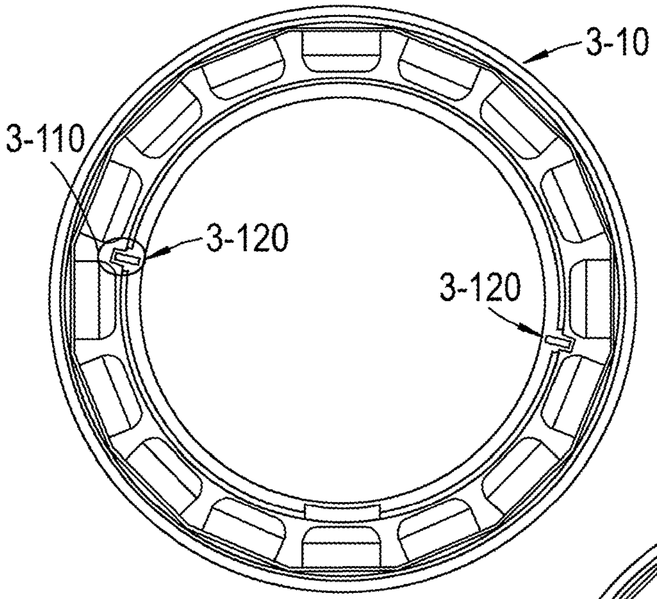
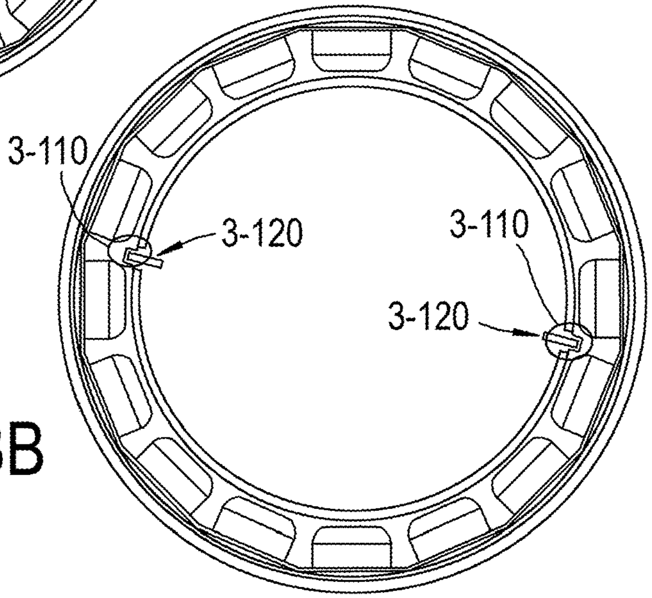
Fig.3B

LOCKABLE ADVANCEABLE ORAL DOSAGE FORM DISPENSER CONTAINERS

RELATED APPLICATIONS

This application is a divisional of U.S. patent application Ser. No. 15/773,138 filed May 2, 2018, which was a United States National Phase entry of International Application No. PCT/IL2016/051178, filed Nov. 1, 2016, which claims the benefit of U.S. Provisional Patent Application No. 62/249,373, filed Nov. 2, 2015. The entire contents of each of the foregoing applications hereby incorporated by reference herein.

FIELD OF THE INVENTION

The present invention relates to the field of controlled medication administration. More particularly, the present invention relates to lockable, advanceable multi-oral dosage form dispenser containers.

BACKGROUND OF THE INVENTION

Unintended use of prescription medications by the intended user or others is a serious problem. Prescription drug abuse is a growing concern worldwide. Regulated dispensing of medications by a health care worker represents a means of addressing correct medication dispensing, but the same is costly, labor intensive and still prone to abuse.

Various solutions to the above-mentioned problems have been pursued, however, they all have difficulties and drawbacks associated with them.

U.S. Pat. No. 7,896,192 to Conley et al. discloses a medication dispenser for permitting access to medication doses after a minimum dosing interval between doses but use of same necessitates involvement of medical personal for dispensing the medication.

Similarly, U.S. Pat. No. 6,766,219 to Hasey discloses a medication dispensing cassette comprising a housing for enclosing at least one continuous track having a plurality of receptacles for medication, wherein each receptacle accommodates one dosage of medication. Hasey's device requires manual dispensing, and therefore does not sufficiently address the limitations noted above.

DE 10236909 to *Udo* discloses a dispenser for pills in a blister pack, having upper and lower sections between which the blister pack is disposed and a push button dispenses pills through apertures in the upper section. The device, however, is not regulated, such that the device does not prevent the user from removing additional pills whenever desired, which in turn does not sufficiently address the limitations noted above.

WO 2011023941 to Sanjeet discloses a motorized deblistering dispenser for dispensing e.g. tablets, from blister packs to a patient, having a programmable control unit for controlling the operation of dispensing platforms so that one or more items are dispensed from one or more platforms. This device, as well, suffers from poor regulation, providing unlimited access to the pills in the dispenser by the user.

US 2005/0252924 to Pieper et al. discloses an apparatus for dispensing tablets, also in the form of pills, dragees or the like, having means for holding a blister pack, means for pushing out a tablet from the blister pack and also means for setting taking times and means for displaying taking times. The apparatus of Pieper et al. however, is a manual dispenser which suffers from the limitations associated with same noted above. Moreover, the patient himself has the ability to control the dispensing of the drug, which is undesirable, particularly when dealing with controlled drugs, as described above.

Accordingly, it is a principal object of the present invention to provide a regulated, lockable dosage form container overcoming the difficulties and drawbacks described in part herein above.

It is another object of the present invention to provide a regulated, lockable dosage form container that provides a device of small dimensions, so that it may be considered to be pocket-sized.

It is another object of the present invention to provide a regulated, lockable dosage form container that prevents manual manipulation of the dosage forms contained therein by the hands of any user, thereby enabling storage and reuse of leftover drugs for a subsequent patient.

It is yet another object of the present invention to provide a regulated, lockable dosage form container that prevents the patient from accessing the drug contained therein unless dispensed by a dispenser.

It is a further object of the present invention to provide regulated, lockable dosage form container that avoids the necessity for requiring interaction by medical staff or anyone other than the patient from the time of calibrating the device until the dosage is complete or the patient no longer needs the medication.

It is yet a further object of the present invention to provide a regulated, lockable dosage form container that enables the controlled sequential delivery of a regimen of pills on an as-needed basis with a predetermined prescribed minimum time interval between delivery of each pill.

Additional objects and advantages of the invention will become apparent as the description proceeds.

SUMMARY OF THE INVENTION

This invention provides a regulated, locakable dosage form container, comprising:

i) an advanceable blister pack holder, comprising a series of access portals sized to accommodate pass-through of at least one dosage form contained within a multi-dosage form containing blister pack located within said holder proximally therethrough upon engagement of an appropriate depilling structure, wherein said advanceable blister pack holder optionally accommodates upright positioning of said dosage forms and said depilling structure displaces said dosage form laterally; and ii) a lockable blister pack dosage form outer container, comprising a tamper proof casing within which said advanceable blister pack holder is contained.

In some aspects, the tamper proof lockable blister pack dosage form outer container further comprises:

at least one access portal sized to accommodate pass-through of at least one dosage form and to align with at least one of said series of access portals in said advanceable blister pack holder;

at least one access port for accessing an element promoting regulated advancement of said advanceable blister pack holder; and at least one releasable locking mechanism element.

This invention also provides a multi-dosage form container, comprising:

i) an advanceable multi-sectioned dosage form holder, comprising a series of access portals sized to accommodate pass-through of at least one dosage form contained within said multi-sectioned dosage form holder proximally therethrough upon alignment with an appropriate egress structure, optionally wherein said multi-sectioned dosage form holder accommodates upright positioning of said dosage forms such that said egress structure provides for lateral displacement of said at least one dosage form; and ii) a lockable outer container, comprising a tamper proof casing within which said multi-sectioned dosage form holder is contained.

In some aspects, the tamper proof lockable outer container further comprises:

at least one access portal sized to accommodate pass-through of at least one dosage form and to align with at least one of said series of access portals in said advanceable holder;

at least one access port for accessing an element promoting regulated advancement of said holder; and optionally at least one releasable locking mechanism element.

In other aspects, the invention provides a kit of parts for the regulated use of a blister pack dosage form container, said kit of parts comprising an advanceable blister pack holder, comprising a series of access portals sized to accommodate pass-through of at least one dosage form contained within a multi-dosage form containing blister pack located within said holder proximally therethrough upon engagement of an appropriate depilling structure.

In some aspects, the kit of parts further comprises a lockable blister pack dosage form outer container, comprising:

a casing within which said advanceable blister pack holder is contained;

one or two access portals sized to accommodate pass-through of at least one dosage form and to align with at least one of said series of access portals in said advanceable blister pack holder;

at least one access port for accessing an element promoting regulated advancement of said advanceable blister pack holder; and optionally at least one releasable locking mechanism element.

In some aspects, the kit components are assembled into a blister pack dosage form container by an authorized pharmacist or health care provider and in some embodiments, either of said advanceable blister pack holder or said lockable blister pack dosage form outer container is packaged separately.

In some embodiments, the invention provides a kit of parts for the regulated use of multi-dosage form container, said kit of parts comprising an advanceable multi-sectioned dosage form holder, comprising a series of access portals sized to accommodate pass-through of at least one dosage form contained within a advanceable multi-sectioned dosage form holder proximally therethrough upon engagement of an appropriate egress structure.

To accomplish the above and related objects, the invention may be embodied in the form illustrated in the accompanying drawings. With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description taken with the attached figures making apparent to those skilled in the art how the several forms of the invention may be embodied in practice.

BRIEF DESCRIPTION OF THE DRAWINGS

FIG. 1A is a perspective view of an embodied blister pack dosage form container of this invention and its coordinated assembly and coordination with a drug dispensing device; FIG. 1B is a perspective view of still further embodied blister pack dosage form container of this invention and its coordinated assembly and coordination with a drug dispensing device; FIG. 1C is a perspective view of an embodied blister pack dosage form container of this invention and its coordinated assembly and coordination with a drug dispensing device including positioning of a mouthpiece on the blister pack dosage form container or drug dispensing device; FIG. 1D is a perspective view of still further embodied blister pack dosage form container of this invention and its coordinated assembly and coordination with a drug dispensing device including positioning of a mouthpiece on the blister pack dosage form container or drug dispensing device; FIG. 1E is a perspective view of still further embodied blister pack dosage form container of this invention and its coordinated assembly and coordination with a drug dispensing device including positioning of a mouthpiece on the blister pack dosage form container or drug dispensing device;

FIGS. 2A-2D schematically depict an advanceable blister pack holder of this invention and its assembly/housing within an embodied blister pack dosage form container of this invention; FIG. 2A is a view of an exemplary embodiment of an advanceable blister pack holder of this invention and its assembly/housing within an embodied blister pack dosage form container of this invention; FIG. 2B is a view of still further exemplary embodiment of an advanceable blister pack holder of this invention and its assembly/housing within an embodied blister pack dosage form container of this invention; FIG. 2C is a view of an exemplary embodiment of an advanceable blister pack holder of this invention; FIG. 2D is an expanded view of an exemplary embodiment of an advanceable blister pack holder of this invention;

FIGS. 3A-3D schematically depict an advanceable blister pack holder of this invention and its assembly/housing within an embodied blister pack dosage form container of this invention including highlighting locking mechanisms incorporated therein; FIG. 3A is a top view of an advanceable blister pack holder of this invention and its assembly/housing within an embodied blister pack dosage form container of this invention including highlighting locking mechanisms incorporated therein; FIG. 3B is a top view of still further an advanceable blister pack holder of this invention and its assembly/housing within an embodied blister pack dosage form container of this invention including highlighting locking mechanisms incorporated therein; FIG. 3C is cut away view of an advanceable blister pack holder of this invention and its assembly/housing within an embodied blister pack dosage form container of this invention including highlighting locking mechanisms incorporated therein; FIG. 3D is a cut away view of still further an advanceable blister pack holder of this invention and its assembly/housing within an embodied blister pack dosage form container of this invention including highlighting locking mechanisms incorporated therein;

FIG. 4A is a sectional view of an additionally embodied locking mechanisms shown in released configuration; FIG. 4B is a sectional view of an additionally embodied locking mechanisms shown in engaged configuration; FIG. 4C is a sectional view of still further embodied locking mechanisms shown in released configuration; FIG. 4D is a sectional view of still further embodied locking mechanisms shown in engaged configuration;

FIG. 5A is a cut away view of still further embodied locking mechanisms; FIG. 5B is a cut away view of still further embodied locking mechanisms and the coordinated implementation in an embodied blister pack dosage form container of this invention assembly with respect to a drug dispensing device; FIG. 5C is a cut away view of still further embodied locking mechanisms; FIG. 5D is a cut away view of still further embodied locking mechanisms and the coordinated implementation in an embodied blister pack dosage form container of this invention assembly with respect to a drug dispensing device; FIG. 5E is a partially exploded view of the embodiment of FIG. 5C and FIG. 5D;

FIG. 6A is a perspective view of another embodied blister pack dosage form container of this invention and regulated advancement of another embodied blister pack dosage form container of this invention; FIG. 6B is a perspective view of still further embodied blister pack dosage form container of this invention and regulated advancement of another embodied blister pack dosage form container of this invention; FIG. 6C is a cut away view of another exemplary embodiment of a blister pack dosage form container of this invention and regulated advancement of another embodied blister pack dosage form container of this invention; FIG. 6D demonstrates an exemplary function of the embodiment of a blister pack dosage form container of this invention and regulated advancement of another embodied blister pack dosage form container of this invention;

FIG. 8A is a perspective exterior view of an embodiment of a multi-dosage form container of this invention, including highlighting locking mechanisms incorporated therein; FIG. 8B is a perspective interior view of an embodiment of a multi-dosage form container of this invention, including highlighting locking mechanisms incorporated therein; FIG. 8C is a perspective view of a multi-sectioned dosage form holder in accordance with the embodiment; FIG. 8D is a section view of a multi-sectioned dosage form holder in accordance with the embodiment; FIG. 8E is a section view of a portion of a multi-dosage form container in accordance with an embodiment; FIG. 8F is section view of a multi-dosage form container in accordance with an embodiment; FIG. 8G is a section view of a portion of a multi-dosage form container in accordance with an embodiment before engagement with a central adapter key of a dosage form dispenser; FIG. 8I is a section view of a portion of a multi-dosage form container in accordance with an embodiment after engagement with a central adapter key of a dosage form dispenser; FIG. 8I is a partial perspective view of a multi-sectioned dosage form holder in accordance with an embodiment; FIG. 8J is perspective view of a central adapter key of the type illustrated in FIG. 8G;

FIG. 9A is an embodied locking mechanism and first engagement position and coordinated implementation in an embodied blister pack dosage form container of this invention and assembly with respect to a drug dispensing device; FIG. 9B is an embodied locking mechanism and second engagement position and coordinated implementation in an embodied blister pack dosage form container of this invention and assembly with respect to a drug dispensing device;

FIG. 10A is a first view of a sequence of successive stages in deployment of a locking mechanism in accordance with a still further embodied locking mechanisms and their coordinated implantation in embodied lockable advanceable oral dosage form dispenser containers of this invention and assembly with respect to a drug dispensing device; FIG. 10B is a second view of a sequence of successive stages in deployment of a locking mechanism in accordance with a still further embodied locking mechanisms and their coordinated implantation in embodied lockable advanceable oral dosage form dispenser containers of this invention and assembly with respect to a drug dispensing device; FIG. 10C is a third view of a sequence of successive stages in deployment of a locking mechanism in accordance with a still further embodied locking mechanisms and their coordinated implantation in embodied lockable advanceable oral dosage form dispenser containers of this invention and assembly with respect to a drug dispensing device.

DETAILED DESCRIPTION OF THE PREFERRED EMBODIMENTS

Figure 1B:
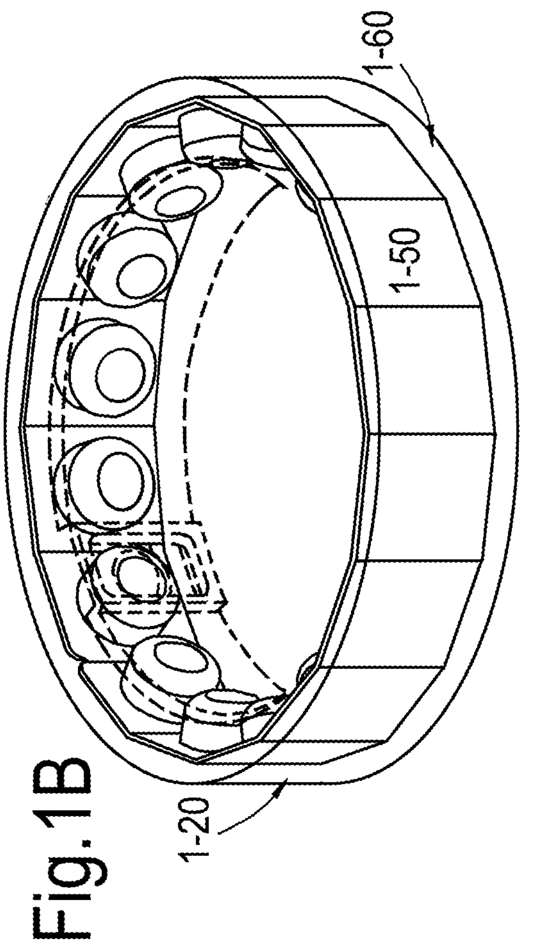
FIGS. 1A-1E schematically depict an embodied blister pack dosage form container of this invention and its coordinated assembly and coordination with a drug dispensing device including positioning of a mouthpiece on the blister pack dosage form container or drug dispensing device, as shown.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

This invention provides regulated, locakable dosage form containers. In some aspects, such regulated, locakable dosage form containers advance at least one dosage form in a regulated manner for dispensing the dosage form to a subject.

In some embodiments, the regulated, locakable dosage form containers specifically accommodate a blister package, and in some embodiments, the regulated, locakable dosage form containers accommodate one or more dosage forms being contained in individual compartments of a multi-sectioned dosage form holder.

In some embodiments, the regulated, locakable dosage form containers of this invention are comprised of a structure and materials such that the container is tamper-proof and the dosage forms located therein cannot be accessed readily by a user or by an unauthorized user.

In some embodiments, uniquely the locakable dosage form containers of this invention are comprised of a structure and materials such that when assembled with an appropriate drug delivery device that can facilitate dispensing of the dosage forms contained within the embodied containers of this invention, the device is compact. In some embodiments, the lateral displacement design in particular allows for a more compacted delivery device profile, once assembled, to provide the user with a slimmer profile device for use. In some aspects, such device when assembled can be considered to be pocket sized, and fully transportable.

In some embodiments, the regulated, locakable dosage form containers ensure that only controlled access is provided to a subject in need of the dosage form contained therein, such that access is restricted to a given dosage amount or timing, or other desired regimen. In some embodiments, greater access is provided to a health care provider, such as a nurse, pharmacist, physician or physician assistant, or other authorized health care worker, for example, to adjust a dosage or regimen, or for example, to load or reload the device.

The regulated, locakable dosage form containers of this invention will comprise a lockable dosage form outer container. Such outer container will be tamper proof, such that it is comprised of a tamper proof casing. According to this aspect, tamper proof casings are well known and may be of a material which is seamed hermetically, locked, and/or not readily destructible, such that the dosage forms contained therein are not accessible except via a regulated mechanism, in an authorized manner.

This invention provides a regulated, locakable dosage form container, comprising:

i) an advanceable blister pack holder, comprising a series of access portals sized to accommodate pass-through of at least one dosage form contained within a multi-dosage form containing blister pack located within said holder proximally therethrough upon engagement of an appropriate depilling structure, wherein said advanceable blister pack holder optionally accommodates upright positioning of said dosage forms and said depilling structure displaces said dosage form laterally; and ii) a lockable blister pack dosage form outer container, comprising a tamper proof casing within which said advanceable blister pack holder is contained.

It will be apparent to the skilled artisan, that there are any number of drug dispenser devices that contain a depilling structure, that can be so designed so that the regulated, locakable dosage form containers can be operationally connected thereto to provide regulated delivery of the dosage forms contained therein. Any such structure, for example, that can specifically facilitate egress of a dosage form from a blister package would satisfy as a “depilling structure” in one embodiment. In another embodiment, a “depilling structure” may also refer to a structure that removes a blockade or manipulates a structure of a dosage form containing chamber in a regulated, locakable dosage form container of this invention, such that egress of a dosage form located in a chamber therein is no longer impeded.

Figure 1D:
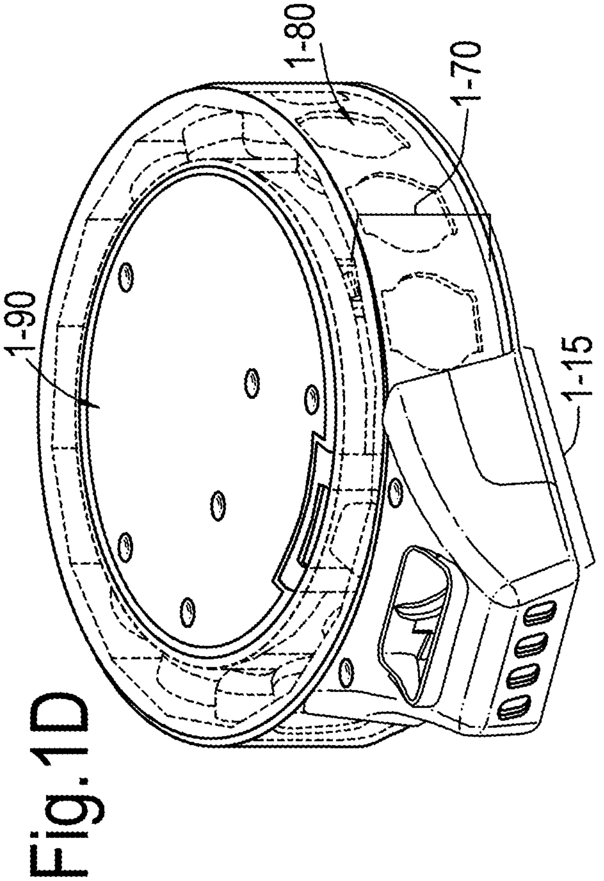
Figure 1A:
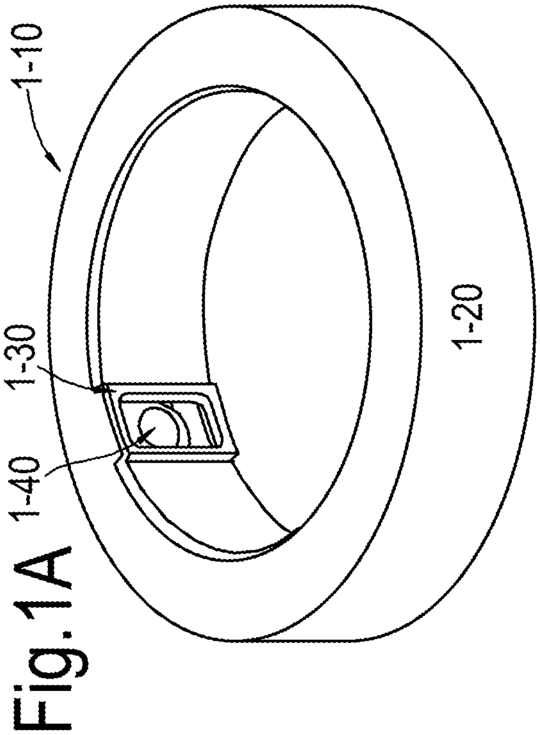

Referring to FIG. 1, and in particular, FIG. 1A, an embodied regulated, locakable dosage form container is depicted. According to this aspect, the lockable outer container 1-10 is shown. Such lockable container comprises a tamper proof casing.

The regulated, locakable dosage form containers of this invention will comprise an advanceable blister pack holder. Referring to FIG. 1B, the outline of the outer container may be seen and the blister pack 1-50 positioned therewithin is seen.

The advanceable blister pack holder will, in some embodiments, comprise a series of access portals sized to accommodate pass-through of at least one dosage form contained within a multi-dosage form containing blister pack located within said holder proximally therethrough upon engagement of an appropriate depilling structure. Referring to FIG. 1D, for example, a series of access portals 1-80 is seen in the advanceable blister pack holder 1-70 depicted in the figure.

According to this aspect, and in one embodiment, the advanceable blister pack holder optionally accommodates upright positioning of at least one dosage form contained therein.

As is apparent from the orientation of the dosage forms with respect to the series of access portals 1-80, when the regulated, locakable dosage form containers of this invention are engaged in an appropriate authorized manner with a depilling structure, the depilling structure may displace the at least one dosage form laterally.

Figure 1C:
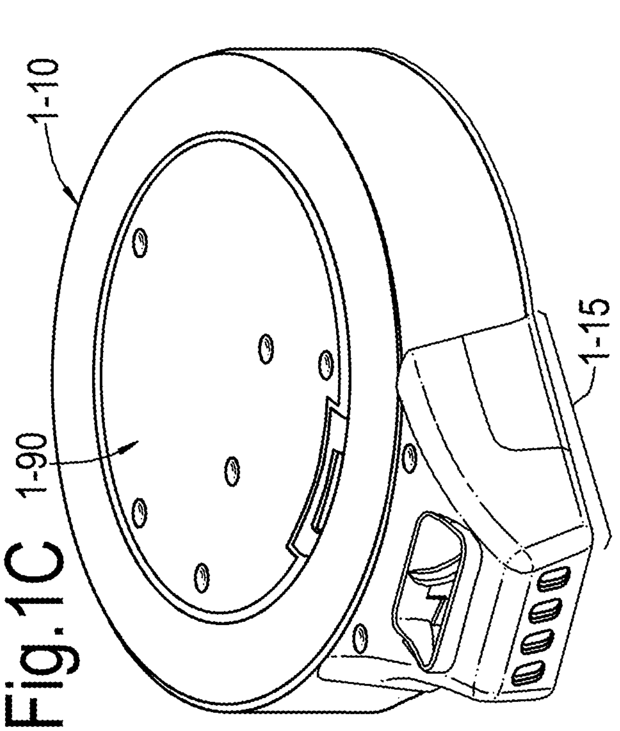

The embodied regulated, locakable dosage form containers of this invention are separate contained units that may comprise a modular delivery system. The embodied regulated, locakable dosage form containers of this invention can be inserted into any appropriate regulated dispenser device, for example, as depicted in FIG. 1C, where the embodied regulated, locakable dosage form container 1-10 inserts within the delivery apparatus 1-90.

It will be appreciated that the embodied regulated, locakable dosage form containers of this invention may be comprised of any suitable materials, for example, any plastic, metal, or other appropriate material. In some embodiments, the embodied regulated, locakable dosage form containers of this invention are comprised of different materials, including a composite of plastics and/or metals, as is suitable for the indicated use.

It will be appreciated that the embodied regulated, locakable dosage form containers of this invention may be for use in conjunction with any appropriate delivery apparatus, that can appropriately advance the advanceable blister pack holder and/or advance the advanceable multi-compartment dosage form holder.

In some aspects, the embodied regulated, locakable dosage form containers of this invention may be used as part of the dosage form containing structures as part of the systems or in conjunction with the devices and apparatuses as described in PCT International Application Publication Numbers WO 2014/00620, WO 2014/020594, Israel Application Number 238,837, all of which are hereby incorporated in their entirety.

It is to be understood that each of the elements of the embodied regulated, locakable dosage form containers are readily constructed using known materials and via known means, as will be appreciated by the skilled artisan.

Figure 1E:
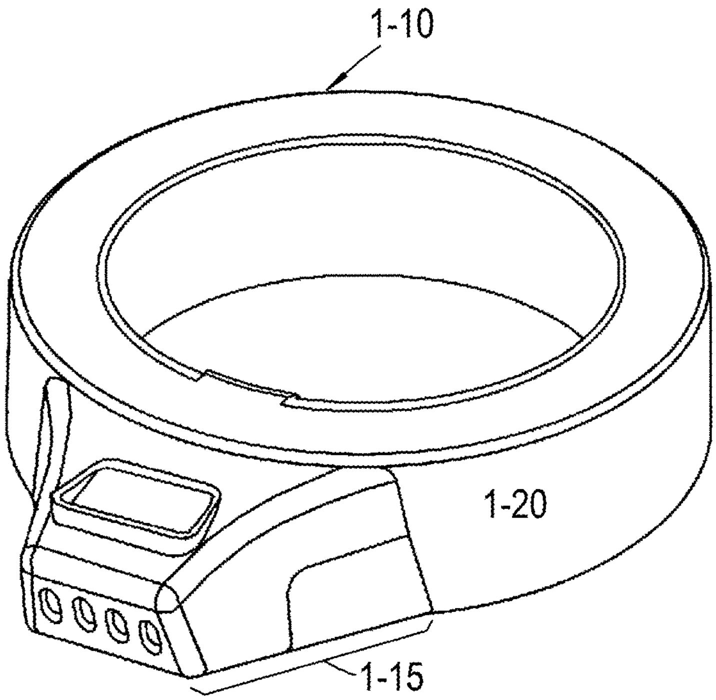

In some embodiments, the tamper proof lockable blister pack dosage form outer container further comprises at least one access portal sized to accommodate pass-through of at least one dosage form and to align with at least one of the series of access portals in said advanceable blister pack holder. Referring to FIG. 1A, an embodied tamper proof lockable blister pack dosage form outer container 1-20 is depicted, which contains an access portal 1-30 sized to accommodate pass-through of at least one dosage form 1-40. Referring to FIG. 1B, the blister pack 1-50 may be positioned directly within the outer container 1-20, so that it rests on the base 1-60 of the container. Referring to FIG. 1D, the dosage form would be displaced laterally through the access portal 1-80 in the advanceable blister pack holder 1-70. According to this aspect, the mouth piece 1-15 evident in FIGS. 1C and 1D is so constructed so as to be prepared as a part of the medication dispensing apparatus. Referring to FIG. 1E, and the embodied blister pack dosage form container 1-10 embodied in this aspect, the mouth piece 1-15 is so constructed so as to be a part or extension of the lockable blister pack dosage form outer container 1-20.

Figure 2A:
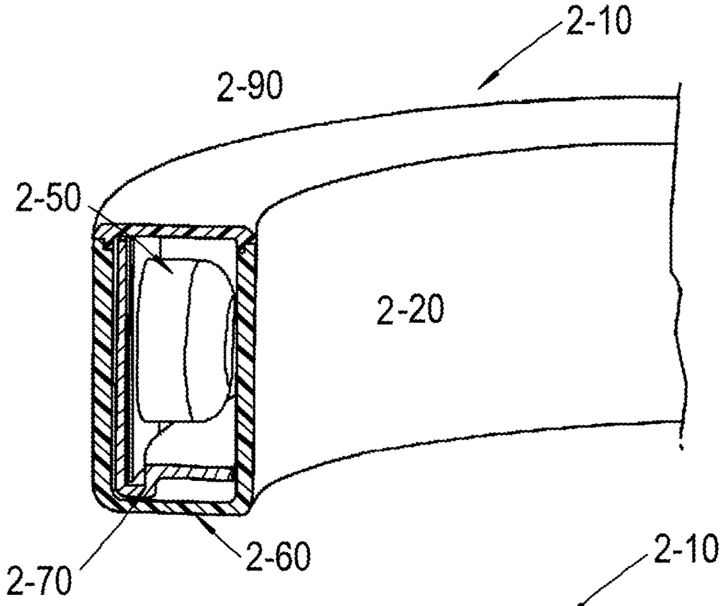

In some aspects, the advanceable blister pack holder 2-70 comprises a first fitted extension, which provides for an accommodated fit of at least a portion of an edge of a multi-dosage form containing blister pack. Referring to FIG. 2A and FIG. 2C, as will be appreciated by the skilled artisan, when a blister package 2-50 is contained within the advanceable blister pack holder 2-70, it may be convenient or useful to have a fitted seating 2-100 for an edge of the blister pack within the holder. According to this aspect, and in some embodiments, such fitted seating may be on a basal surface, as depicted in 2-100, or in some embodiments, the fitted seating may be on an apical surface or in some embodiments, on a lateral surface.

The blister pack holder 2-70 can still be readily accommodated within the lockable blister pack dosage form outer container 2-20.

Figure 2B:
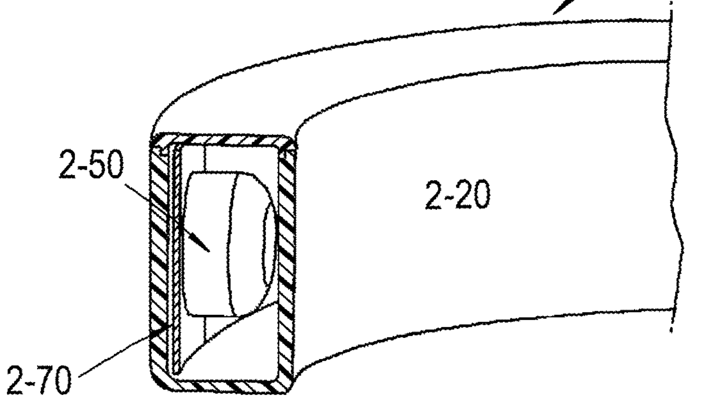
Figure 3D:
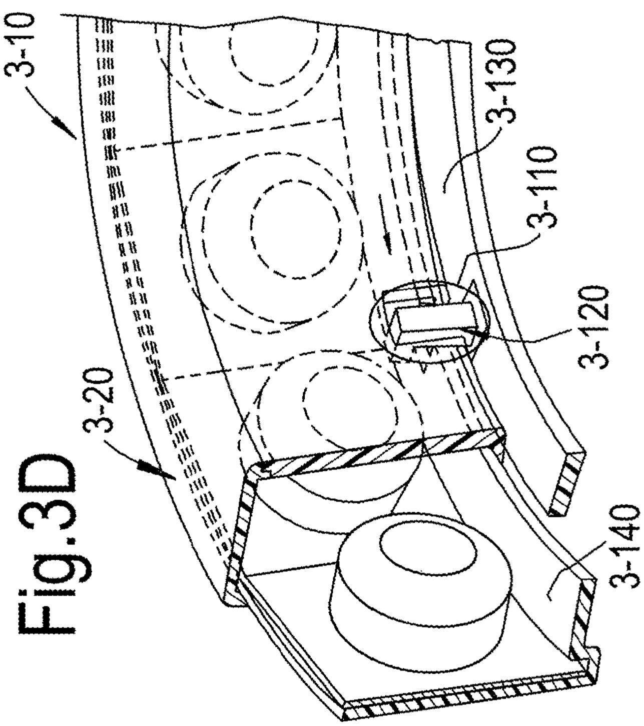

It will be appreciated that while convenient, the same is not required, as is evident for example in FIG. 2B.

In some embodiments, the tamper proof, lockable blister pack dosage form outer container may comprise a second fitted extension, which provides for an accommodated fit of a second edge of the blister pack within the holder.

In some embodiments, the tamper proof lockable blister pack dosage form outer container further comprises at least one releasable locking mechanism element and at least one access port for accessing an element promoting regulated advancement of said advanceable blister pack holder.

In some aspects, the tamper proof lockable blister pack dosage form outer container releasable locking mechanism element locks the regulated, locakable dosage form container to a medication dispensing apparatus, for example, locking the container 1-10 to the dispenser 1-90.

In some aspects, the tamper proof lockable blister pack dosage form outer container releasable locking mechanism element enables locking of the advanceable blister pack holder so that a dosage form cannot be accessed via the access portal.

In some embodiments, the regulated, locakable dosage form container may contain a locking mechanism that locks both the regulated, locakable dosage form container to a medication dispensing apparatus as well as locking of the advanceable blister pack holder so that a dosage form cannot be accessed via the access portal. In some embodiments, the regulated, locakable dosage form container may contain multiple locking elements and different mechanisms to accomplish locking the regulated, locakable dosage form container to a medication dispensing apparatus, and/or locking of the advanceable blister pack holder so that a dosage form cannot be accessed via the access portal.

It will be appreciated that the locking mechanisms of this invention may be comprised of any suitable materials, for example, any plastic, metal, or other appropriate material. In some embodiments, the embodied locking mechanisms of this invention are comprised of different materials, including a composite of plastics and/or metals, as is suitable for the indicated use.

Referring to FIG. 3A-3D, the regulated, locakable dosage form container 3-20 may contain a locking mechanism that locks the regulated, locakable dosage form container to a medication dispensing apparatus. In one aspect, such locking mechanism will contain at least one access port 3-110 by which the regulated, locakable dosage form container 3-20 is locked to a medication dispensing apparatus 3-130. According to this aspect, the medication dispensing apparatus may further comprise a locking part, for example, a locking protrusion 3-120, which inserts within the access port 3-110, and fits onto the advanceable blister pack holder 3-140, which in turn prevents advancement of same, once fully engaged.

In some embodiments, the locking protrusion 3-120, which inserts within the access port 3-110, and fits onto the advanceable blister pack holder 3-140, yet does not interfere with advancement of same, such that the blister pack holder 3-140 can still advance when the locking protrusion is engaged, however, the regulated, locakable dosage form container cannot be disengaged from the medication dispenser 3-130 containing the protruding part 3-120.

In some embodiments, the lockable advanceable dosage form dispenser containers of this invention may comprise one or more access ports. In one embodiment, the access port may promote access of a depilling structure to a dosage form located within a blister pack, such as, for example, as depicted in FIG. 1A (1-30). In this aspect, the access port in in an internal lateral surface of the lockable advanceable oral dosage form dispenser containers of this invention.

In another embodiment, the access port may promote egress of a dosage form a lockable advanceable dosage form dispenser container of this invention. According to this aspect, and in some embodiments, this access port is in an external lateral surface of the lockable advanceable oral dosage form dispenser container of this invention.

In another embodiment, the lockable advanceable dosage form dispenser containers of this invention may comprise an access port facilitating engagement by a locking protrusion as described herein.

In another embodiment, the lockable advanceable dosage form dispenser containers of this invention may comprise an access port facilitating regulated advancement of the advanceable blister pack holder, advanceable blister pack, or advanceable multi-dosage form containers of this invention.

In some embodiments, an access port as herein described may be characterized to be suitable for any of the above-described independent functions, or in some embodiment, a single access port may serve for two or more described such functions, for example, and representing some embodiments, the access port promoting engagement of the locking protrusions therewith may also provide address to a depilling structure, as herein described.

In some embodiments, the lockable blister pack dosage form outer container will further contain at least one access port for accessing an element promoting regulated advancement of said advanceable blister pack holder and optionally at least one releasable locking mechanism element. Referring now to FIGS. 4A-4D, the outer container 4-20 contains one or more access ports 4-110, and one or more releasable locking mechanism elements 4-150, which releasably lock the advancement of the blister pack holder 4-140. Referring to FIG. 4A, when the locking mechanism is in its locked position, the mechanism 4-150 engages the blister pack holder 4-140 and prevents its further advancement, which in turn prevents advancing for example, a next blister containing an oral dosage form to be flush with the access portal of the outer container, thereby preventing further dispensing of a first or next dosage form.

Figure 4B:
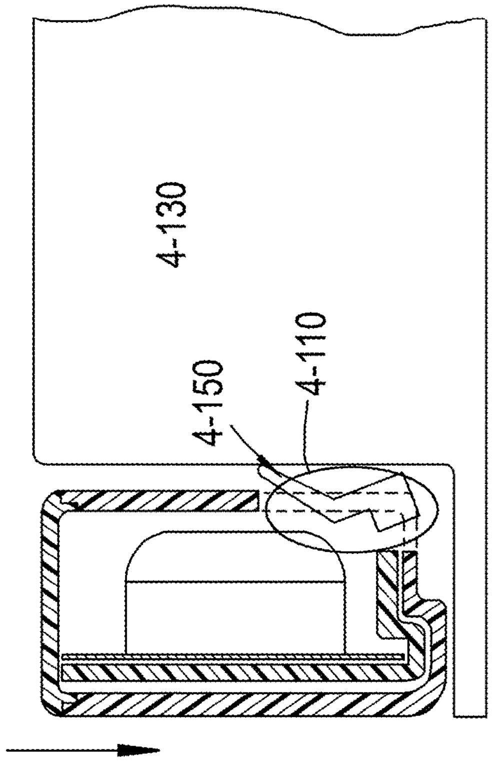
FIGS. 4A-4D schematically depict additionally embodied locking mechanisms.
Figure 3C:
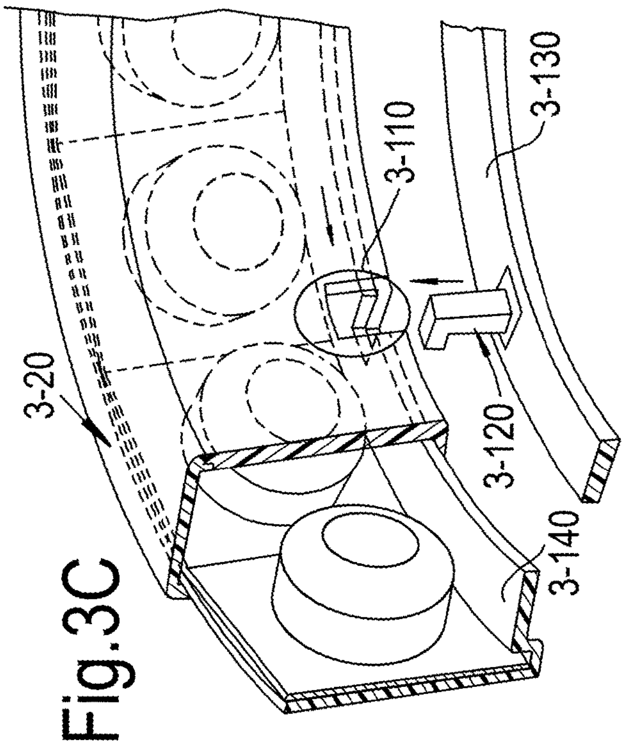
Figure 4A:
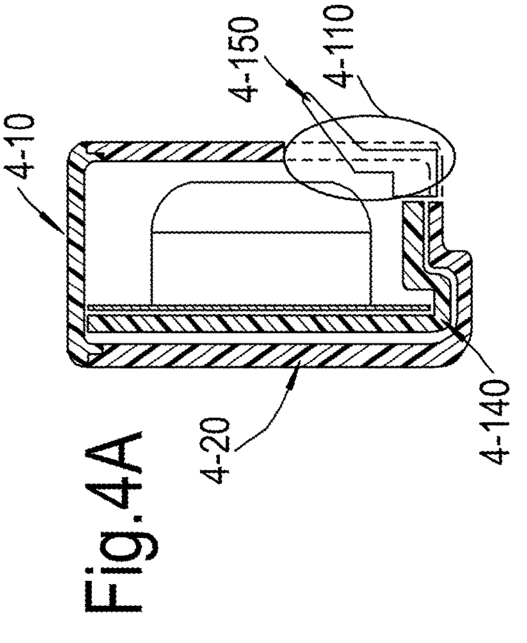

Referring to FIG. 4B, engagement of the locking mechanism 4-130 promotes a change in configuration of the mechanism 4-150, so that the locking mechanism no longer engages or locks the blister pack holder 4-140, and promotes advancement of the blister pack holder.

Figure 4D:
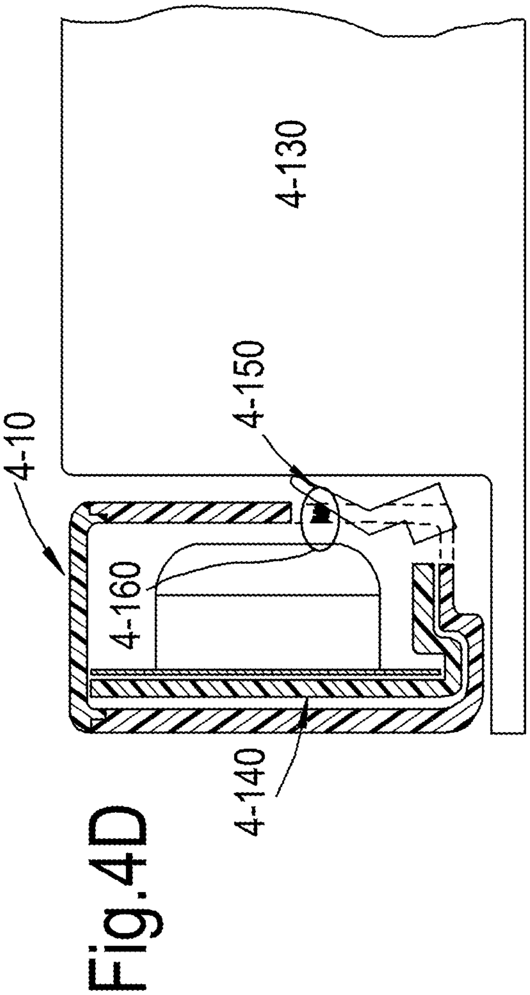
Figure 4C:
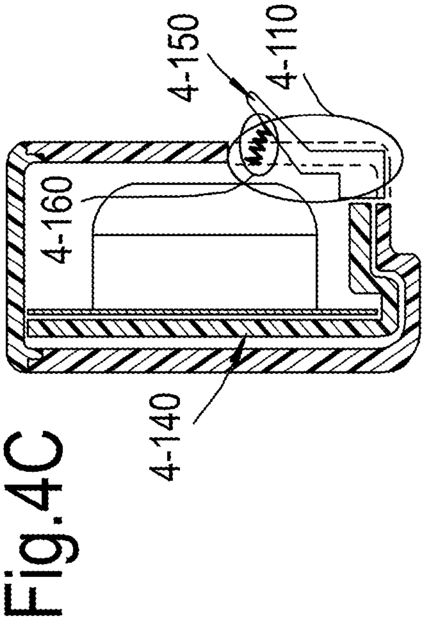

FIGS. 4C and 4D, similarly show engaged and released configurations of the locking mechanism, 4-150, as in FIGS. 4A and 4B, respectively, and in this aspect, the locking mechanism further comprises a spring 4-160 as part of the releasable locking mechanism.

Figure 5B:
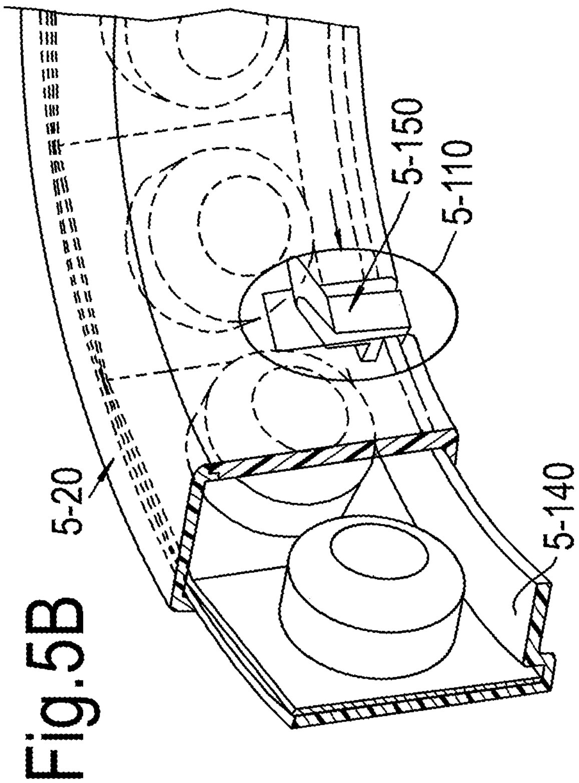
FIGS. 5A-5E schematically depict still further embodied locking mechanisms and their coordinated implementation in an embodied blister pack dosage form container of this invention and assembly with respect to a drug dispensing device.
Figure 5A:
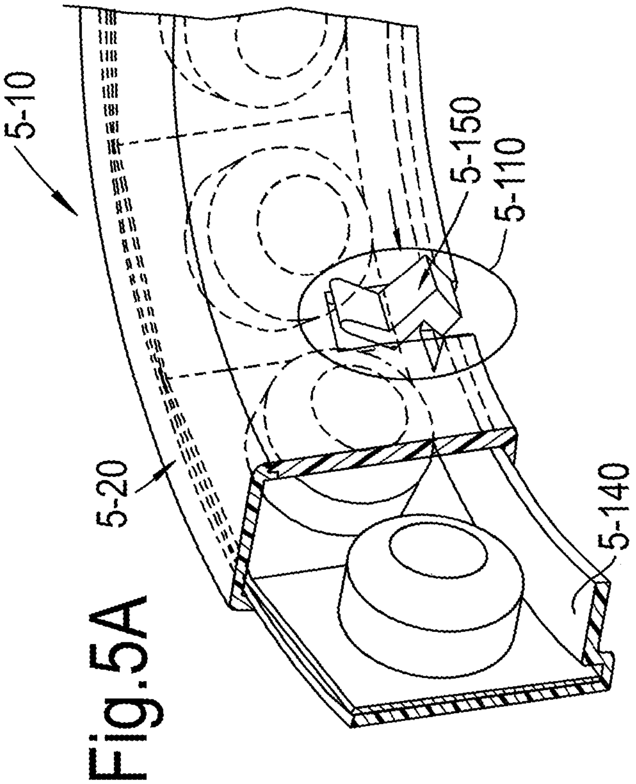

Referring to FIGS. 5A and 5B, a different view of an embodied device using similar principles as depicted in FIGS. 4A and 4B is depicted, such that advancement of the blister pack holder 5-140 is readily seen as unobstructed (direction of the arrow), since the locking mechanism 5-150 is not lockably engaged. In FIG. 5B, once the locking mechanism 5-150 is engaged, the mechanism provides an obstruction to the advancement of the blister pack holder 5-140, preventing further advancement of same.

Figure 5C:
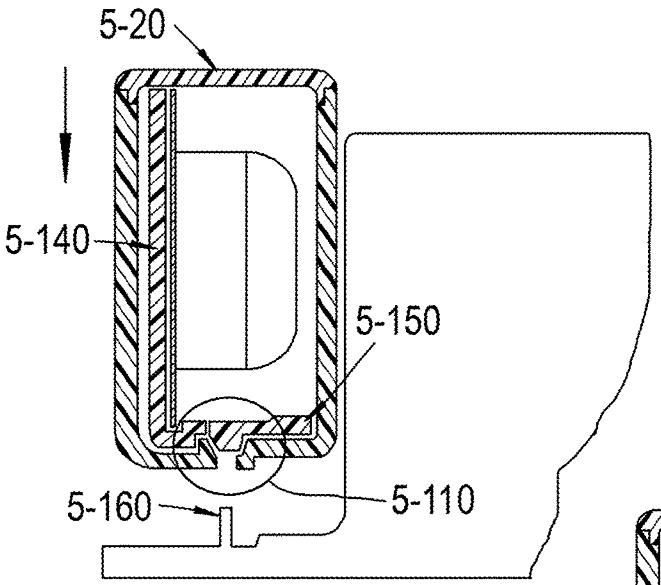
Figure 5D:
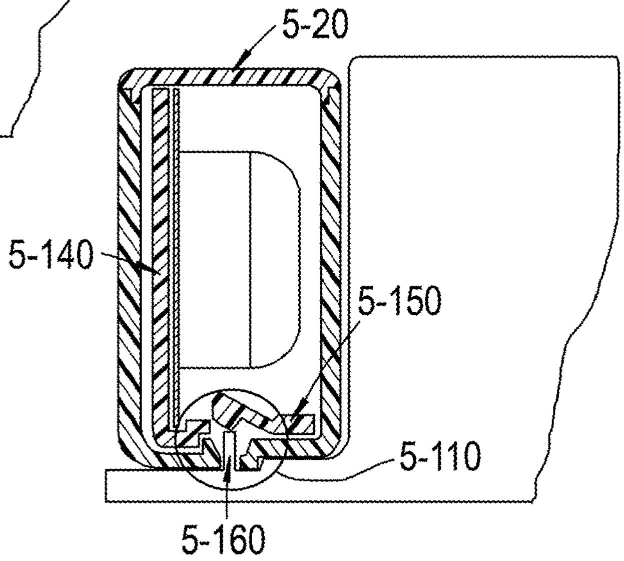

Referring to FIGS. 5C and 5D, a different view of an embodied device using similar principles as depicted, e.g. in FIGS. 5A and 5B is depicted, such that advancement of the blister pack holder 5-140 is obstructed since the locking mechanism 5-150 is lockably engaged. In FIG. 5B, once the locking mechanism 5-150 is engaged, the mechanism provides an obstruction to the advancement of the blister pack holder 5-140, preventing further advancement of same. In this embodiment, once the outer casing 5-20 is lockably engaged within the drug dispensing device, via a stopper or pin 5-160, the locking mechanism 5-150 is then mobilized so that the advancement of the blister pack holder 5-140 is no longer obstructed.

Figure 5E:
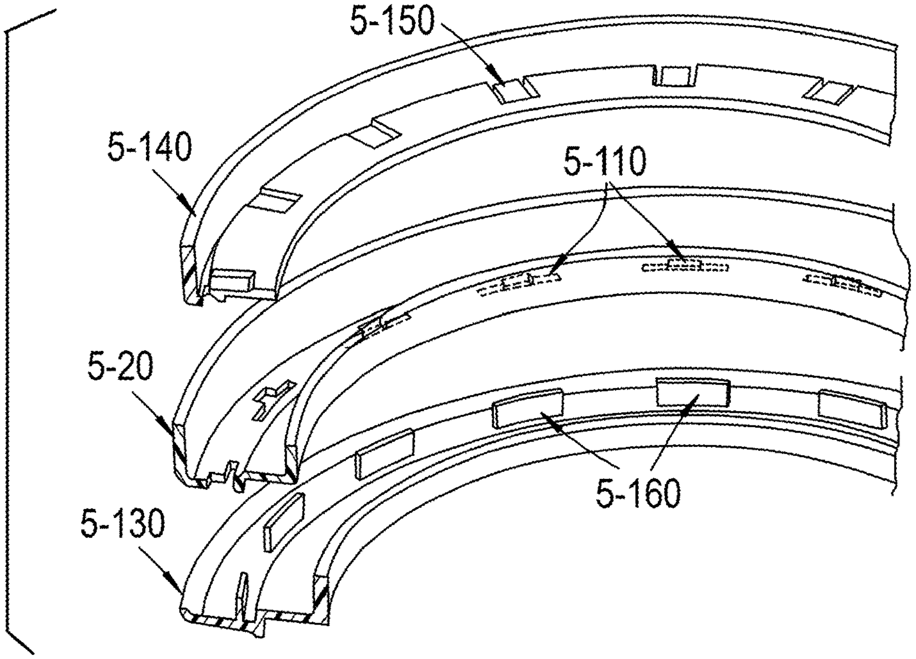

Referring to FIG. 5E, the blister pack holder 5-140 is shown in an alternate view showing a top view of an embodied locking mechanism 5-150, which when engaged can insert into the outer casing in region 5-110, as shown in the side view depicted in FIG. 5C, and depicted in a top view in FIG. 5E. Similarly, the stopper or pin 5-160 associated with an element of the drug dispensing device 5-130 is depicted in top view to show potential engagement of same within the outer container 5-20.

While certain aspects of the locking mechanism have been depicted in the Figures, it will be clear to the skilled artisan that any appropriate locking mechanism, for example, a series of "locking pins" or spring-loaded rods, or other mechanisms may be used in a releasable manner such that engagement of same prevents lateral movement of the blister pack holder, and release of same permits lateral movement of the blister pack holder.

In some embodiments, the advanceable blister pack holder further comprises a component of a reciprocating regulated dosage form advancing assembly, which component promotes advancement of said blister pack holder to position successive dosage forms contained within said multi-dosage form containing blister pack located within said holder in a regulated manner.

Referring now to FIGS. 6A-6D, and according to this aspect, the blister pack holder 6-140 may be so modified to comprise a component 6-170 of a reciprocating regulated dosage form advancing assembly 6-180, which in turn may be further connected to a gear relay connected to a motor 6-190, which component promotes advancement of said blister pack holder 6-140 to position successive dosage forms 6-145 contained within said multi-dosage form containing blister pack 6-155 located within said holder 6-140 in a regulated manner. According to this aspect, positioning of the dosage form within element 6-200 or proximal to the element depicted as 6-210, facilitates engagement of the appropriate depilling structure, to promote delivery of the dosage form.

Figure 6B:
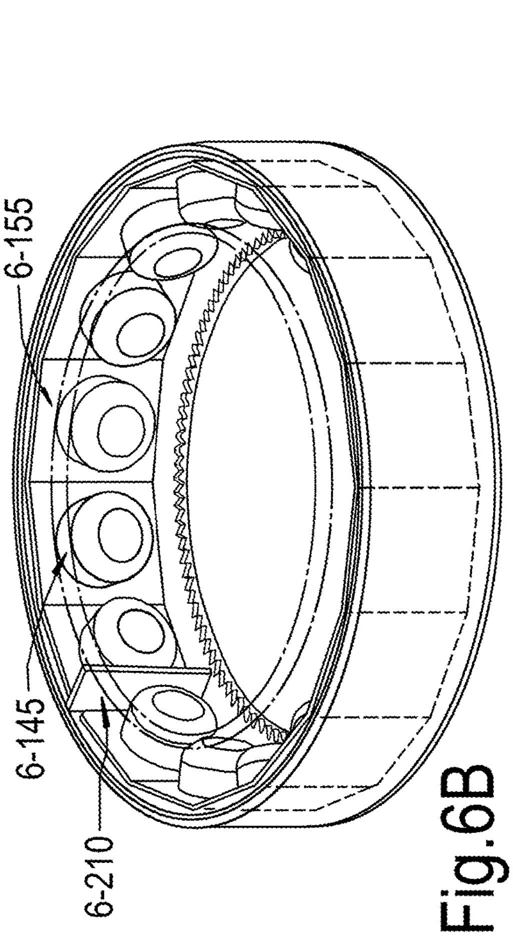
FIGS. 6A-6D schematically depict another embodied blister pack dosage form container of this invention and regulated advancement of another embodied blister pack dosage form container of this invention.
Figure 6D:
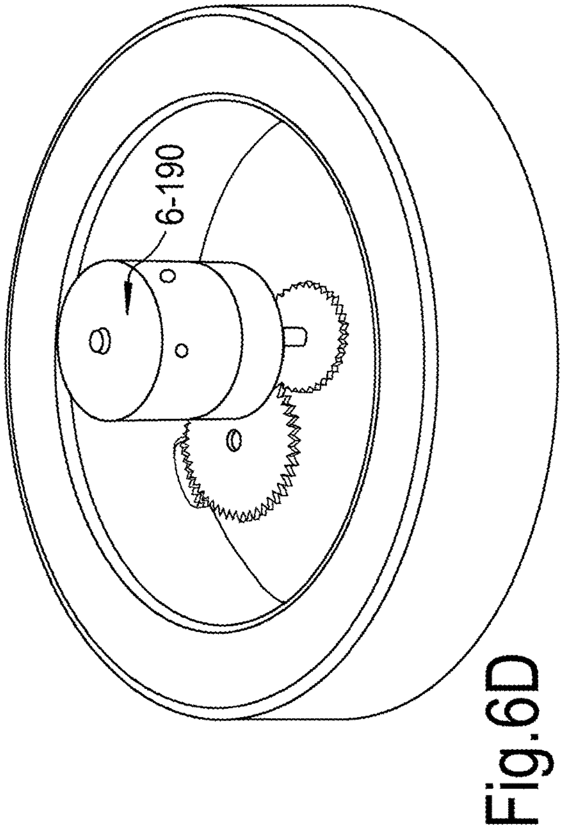

Such rotation can be manual, or a motor (6-190) may be used, for example as depicted in FIG. 6D.

Advancement of the advanceable blister pack holder 6-140 ultimately advances a particular dosage form into position within the regulated, lockable dosage form container, to be appropriately positioned with respect to the access port in the outer container to facilitate pass-through of the dosage form contained within the holder proximally therethrough to the access port in the container.

Figure 6A:
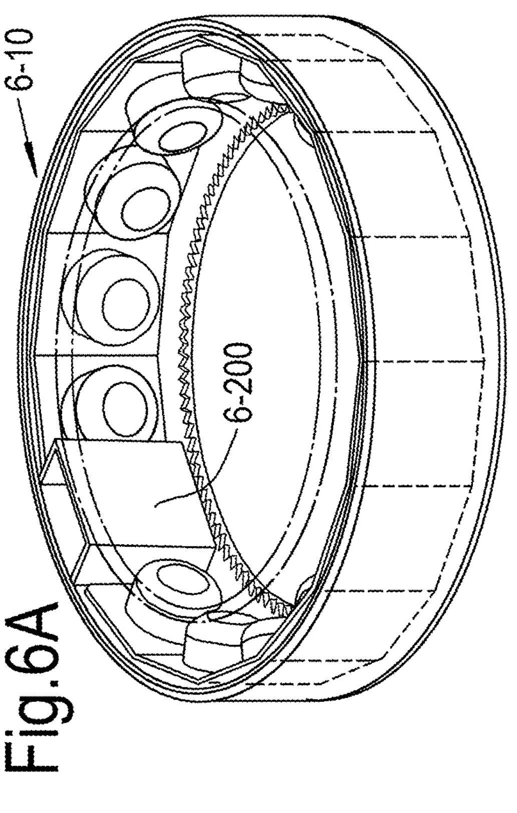

Referring to FIG. 6A, advancement of the dosage form to be located within the region defined by structure 6-200 places the dosage form located therein proximal to the access port on the outer side of the container, not evident from this view in the drawing. The location can also be a tabbed 6-210 or locked position through any appropriate structure, positioning the dosage form proximally to the access port on the outer side of the container.

Figure 6C:
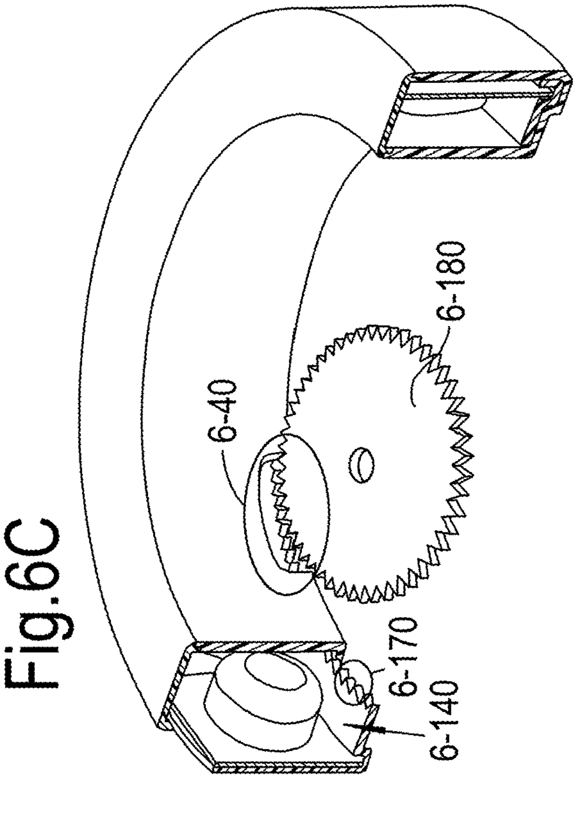

In some aspects, a component of a reciprocating gear assembly 6-180 is engaged with additional components of said reciprocating gear assembly via the access port which may extend through the container, for example, as a slit aperture 6-40 in the inner surface of the outer container, as depicted in FIG. 6C.

Figure 7:
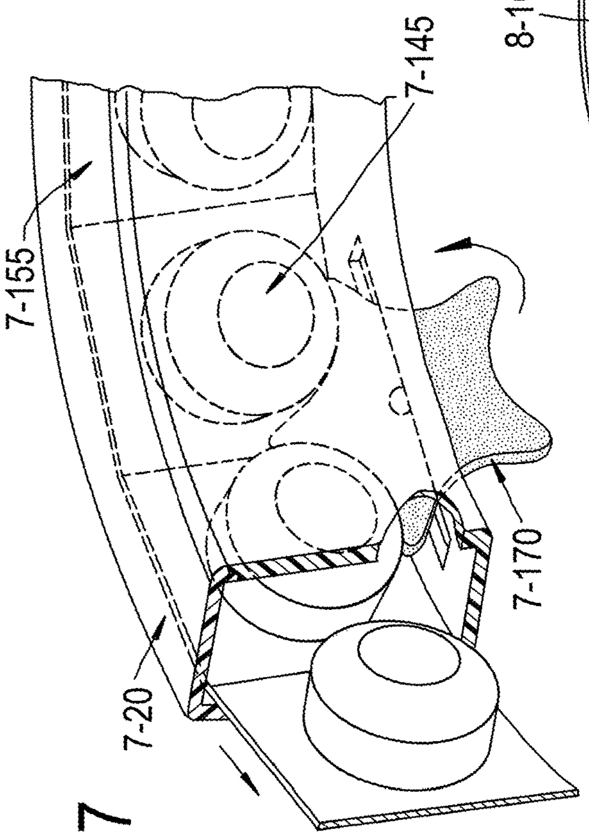
FIG. 7 schematically depicts another embodied blister pack dosage form container of this invention and an advancing mechanism for a blister pack located therein.

Another embodied device is shown in FIG. 7. According to this aspect, the blister pack 7-155 is placed directly within the lockable blister pack dosage form outer container 7-20, without use of an additional advanceable blister pack holder. In one aspect, the container 7-20 may be so modified to comprise a component 7-170 of a reciprocating regulated dosage form advancing assembly, which component promotes advancement of said blister pack to position successive dosage forms 7-145 contained within said multi-dosage form containing blister pack 7-in a regulated manner. The skilled artisan will appreciate that any number of engaging means may be incorporated within an appropriate device for the delivery of the dosage form, which specifically engage the component 7-170 of a reciprocating regulated dosage form advancing assembly.

In another aspect, this invention provides a multi-dosage form container, comprising:

i) an advanceable multi-sectioned dosage form holder, comprising a series of access portals sized to accommodate pass-through of at least one dosage form contained within said multi-sectioned dosage form holder proximally therethrough upon alignment with an appropriate egress structure, wherein said multi-sectioned dosage form holder accommodates upright positioning of said dosage forms such that said egress structure provides for lateral displacement of said at least one dosage form; and ii) a lockable outer container, comprising a tamper proof casing within which said multi-sectioned dosage form holder is contained.

Referring to FIGS. 8A-8J, an embodied regulated, lockable multi-dosage form container is depicted. According to this aspect, the lockable outer container 8-20 is shown. Such lockable container comprises a tamper proof casing.

Figure 8B:
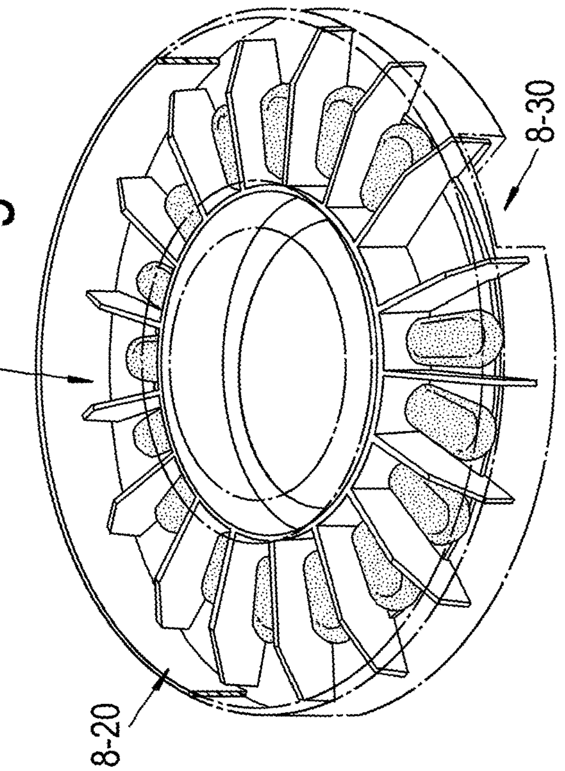
FIGS. 8A-8J schematically depict an embodied multi-dosage form container of this invention, including highlighting locking mechanisms incorporated therein.

The regulated, locakable multi-dosage form containers of this invention will comprise a multi-sectioned dosage form holder. Referring to FIG. 8B, the outline of the outer container 8-20 may be seen and the dosage forms 8-15 positioned within respective compartments 8-45 of the multi-sectioned dosage form holder 8-70 is seen.

Figure 8A:
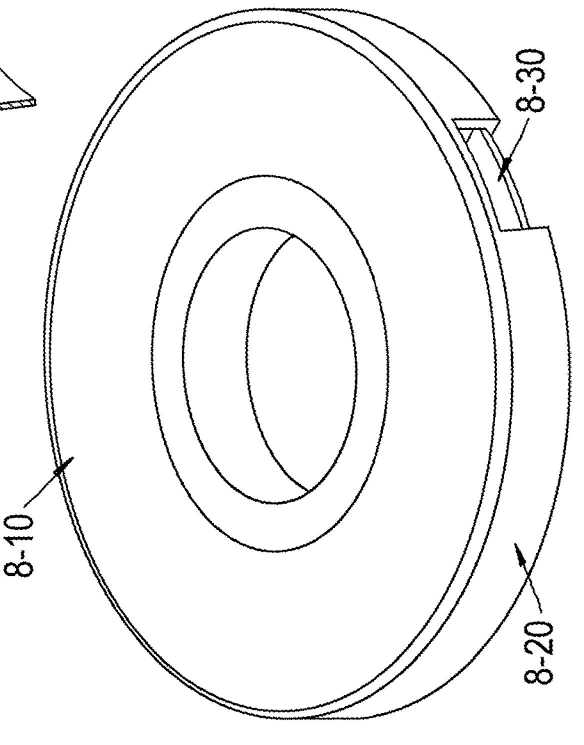
Figure 8D:
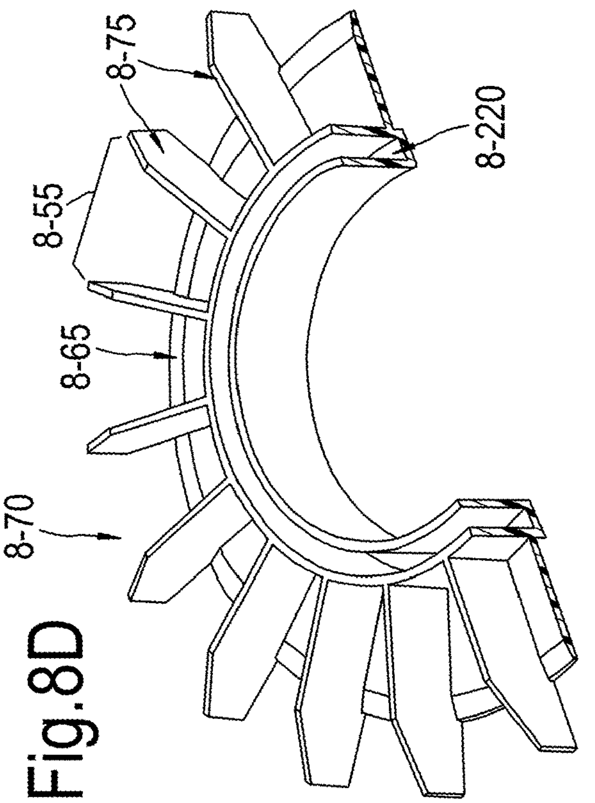

The advanceable multi-sectioned dosage form holder will, in some embodiments, comprise a series of access portals sized to accommodate pass-through of at least one dosage form contained within the multi-sectioned dosage form holder upon alignment with an appropriate egress structure. Referring to FIG. 8D, for example, a series of access portals 8-55 is seen in the advanceable multi-sectioned dosage form holder 8-70 depicted in the figure.

According to this aspect, and in one embodiment, the advanceable multi-sectioned dosage form holder optionally accommodates upright positioning of at least one dosage form contained therein.

As is apparent from the orientation of the dosage forms with respect to the series of access portals 8-55, when the regulated, locakable dosage form containers of this invention are positioned and properly aligned with respect to the egress structure of the container in an appropriate authorized manner, the at least one dosage form is released in a regulated manner.

The embodied regulated, locakable dosage form containers of this invention are separate contained units that may comprise a modular delivery system. The embodied regulated, locakable dosage form containers of this invention can be inserted into any appropriate regulated dispenser device, for example, similarly as depicted in FIG. 1C, where the embodied regulated, locakable dosage form container 8-10 can insert within the delivery apparatus.

It will be appreciated that the embodied regulated, locakable dosage form containers of this invention may be comprised of any suitable materials, for example, any plastic, metal, or other appropriate material. In some embodiments, the embodied regulated, locakable dosage form containers of this invention are comprised of different materials, including a composite of plastics and/or metals, as is suitable for the indicated use.

In some embodiments, the tamper proof lockable multi-sectioned dosage form holder outer container further comprises at least one access portal sized to accommodate pass-through of at least one dosage form and to align with at least one of the series of access portals in said advanceable multi-sectioned dosage form holder. In some aspects, the advanceable multi-sectioned dosage form holder 8-70 provides for an accommodated fit of at least one dosage form. Referring to FIG. 8A and FIG. 8C, as will be appreciated by the skilled artisan, the multi-sectioned dosage form holder 8-70 can still be readily accommodated within the outer container 8-20.

In some embodiments, the tamper proof lockable outer container further comprises at least one releasable locking mechanism element and at least one access port for accessing an element promoting regulated advancement of said advanceable multi-sectioned dosage form holder.

In some aspects, the tamper proof lockable outer container releasable locking mechanism element locks the regulated, locakable dosage form container to a medication dispensing apparatus, for example, locking the container 8-10 to a dispenser.

In some aspects, the tamper proof lockable outer container releasable locking mechanism element enables locking of the advanceable multi-sectioned dosage form holder so that a dosage form cannot be accessed via the access portal.

In some embodiments, the regulated, locakable dosage form container may contain a locking mechanism that locks both the regulated, locakable dosage form container to a medication dispensing apparatus as well as locking of the advanceable multi-sectioned dosage form holder so that a dosage form cannot be accessed via the access portal. In some embodiments, the regulated, locakable dosage form container may contain multiple locking elements and different mechanisms to accomplish locking the regulated, locakable dosage form container to a medication dispensing apparatus, and/or locking of the advanceable multi-sectioned dosage form holder so that a dosage form cannot be accessed via the access portal.

It will be appreciated that the locking mechanisms of this invention may be comprised of any suitable materials, for example, any plastic, metal, or other appropriate material. In some embodiments, the embodied locking mechanisms of this invention are comprised of different materials, including a composite of plastics and/or metals, as is suitable for the indicated use.

FIG. 8A-8H depicts an embodied multi-dosage form container 8-10, comprising an advanceable multi-sectioned dosage form holder 8-70, comprising at least one access portal 8-55 sized to accommodate pass-through of at least one dosage form 8-15 contained within said multi-sectioned dosage form holder proximally therethrough upon alignment with an appropriate egress structure 8-30, optionally wherein said multi-sectioned dosage form holder accommodates upright positioning of said dosage forms such that said egress structure provides for lateral displacement of said at least one dosage form; and a lockable outer container 8-20, comprising a tamper proof casing within which said multi-sectioned dosage form holder 8-70 is contained.

In some aspects, the multi-sectioned dosage form holder 8-70, the holder comprises a series of compartments, defined by a pair of side walls 8-75 and a floor 8-65, on which a dosage form 8-15 rests. The floor 8-65 may be of a length to be almost flush with the outer container, or in some embodiments, the floor is sufficient to serve as a rest for the contained dosage form, but the outer casing 8-20 serves to enclose the dosage form fully. In some embodiments, the multi-sectioned dosage form holder 8-70 is adapted to allow for a tight seal with a cover 8-95 of an outer container, which seams with the outer container 8-20. The multi-sectioned dosage form holder 8-70 may contain a central section 8-220 that provides a tight fit with an element of the cover 8-95 as one means to enclose the multi-sectioned dosage form holder 8-70.

In some aspect, the multi-sectioned dosage form holder 8-70 further comprises a component of a reciprocating regulated dosage form advancing assembly 8-170, which component promotes advancement of said holder 8-70 to position successive dosage forms contained within said multi-sectioned dosage form holder in a regulated manner.

Figure 8F:
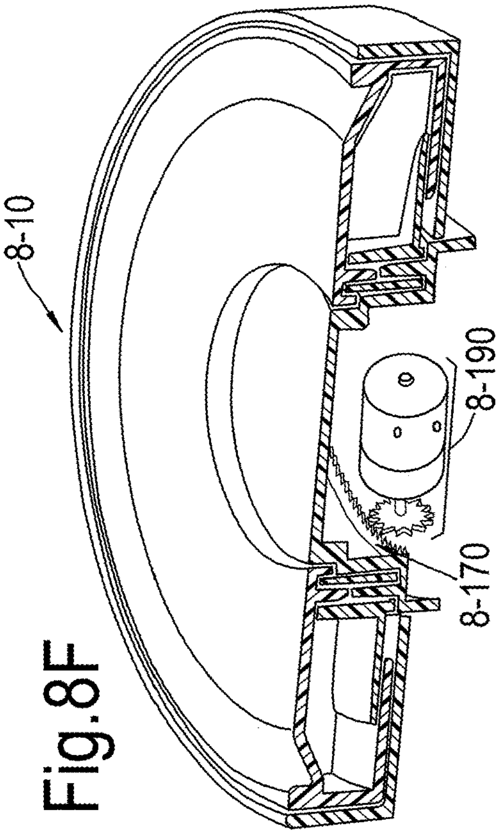
Figure 8C:
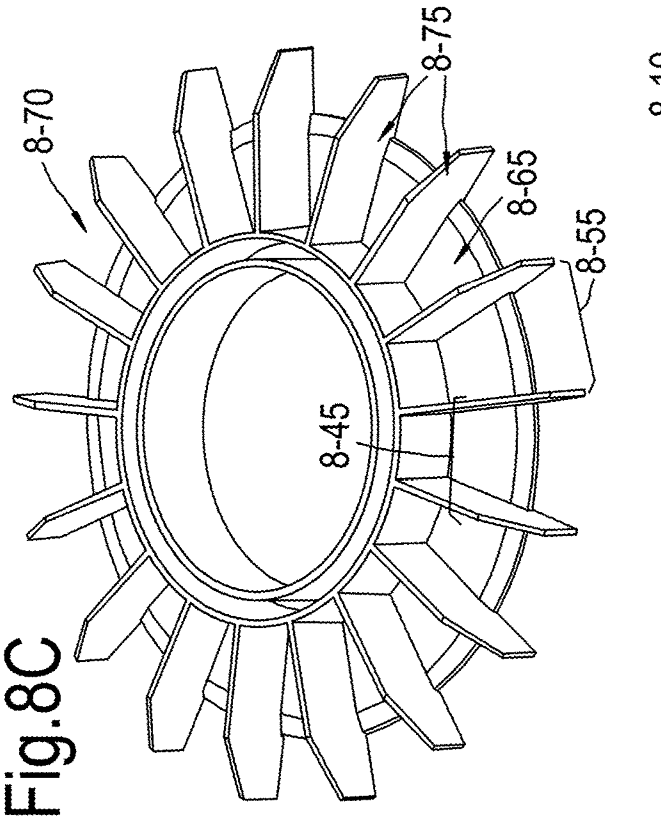
Figure 8E:
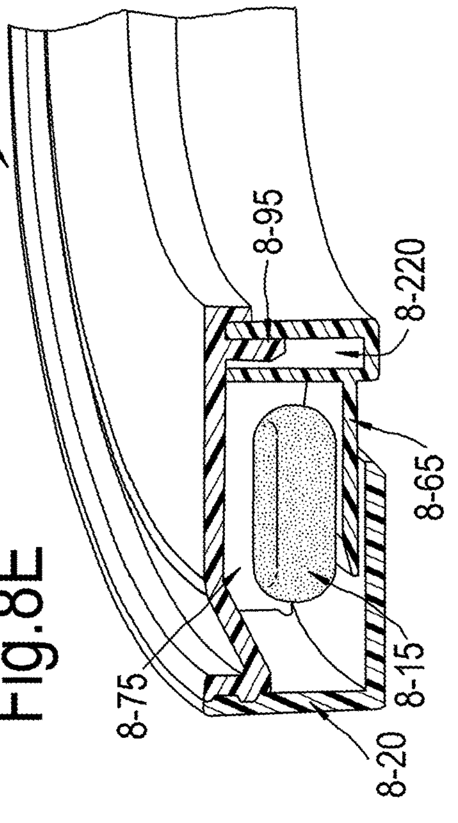
Figure 8H:
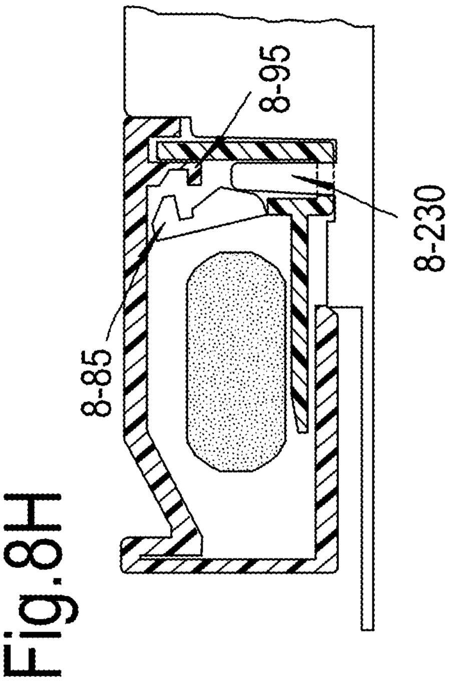

In some aspects, the reciprocating regulated dosage form advancing assembly 8-170 interacts with a complementary element, for example a gear and motor assembly 8-190, as depicted in FIG. 8F.

In some aspect, the multi-dosage form container comprises at least one releasable locking mechanism element 8-85. In some aspects, such releasable locking mechanism element 8-85 may engage a reciprocal locking structure 8-95, which in some embodiments is part of an outer container 8-20. In some embodiments, the multi-dosage form container may be further adapted to contain an adapted region 8-220, into which a lockable extension 8-230 may insert. Such lockable extension may be a component/adaptation of the dosage form delivery device, that facilitates locking the multi-dosage form container to same, while simultaneously laterally displacing the locking mechanism element 8-85 to permit rotation of the multi-sectioned dosage form holder 8-70.

Figure 8J:
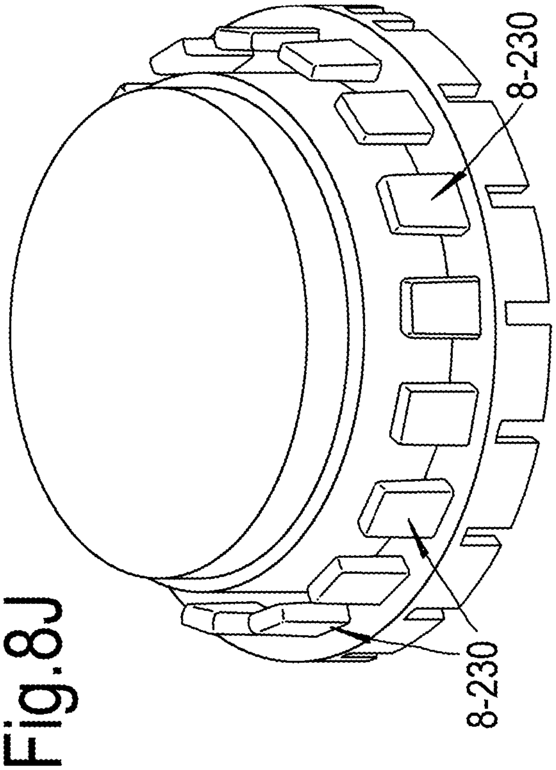
Figure 8G:
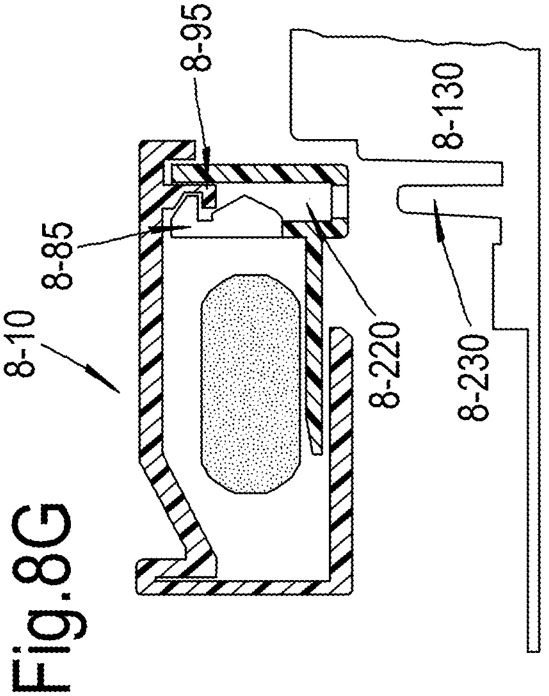
Figure 8I:
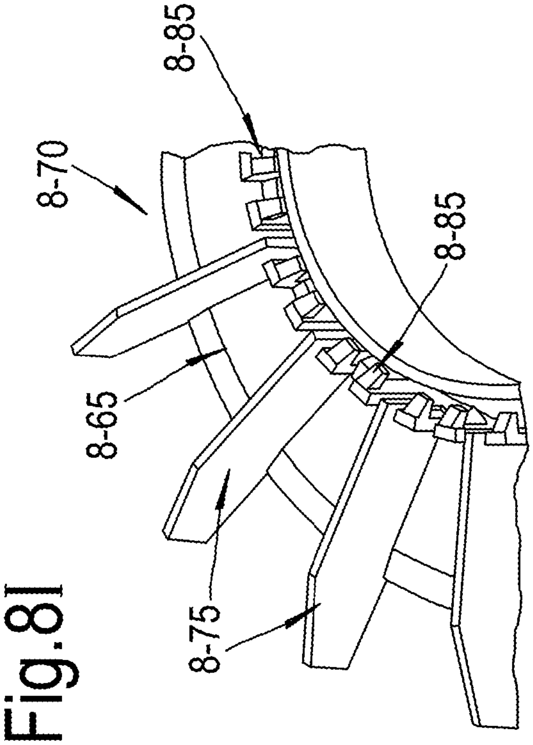

Referring to FIG. 8I, a cutaway view of the multi-sectioned dosage form holder 8-70 showing an embodied orientation of a releasable locking mechanism element 8-85 is seen.

Referring to FIG. 8J, a view of a central adapter key is shown containing lockable extensions 8-230, which in turn provide an accommodated fit with the multi-sectioned dosage form holder 8-70 when the dosage form holder and dispenser is assembled.

Figure 9A:
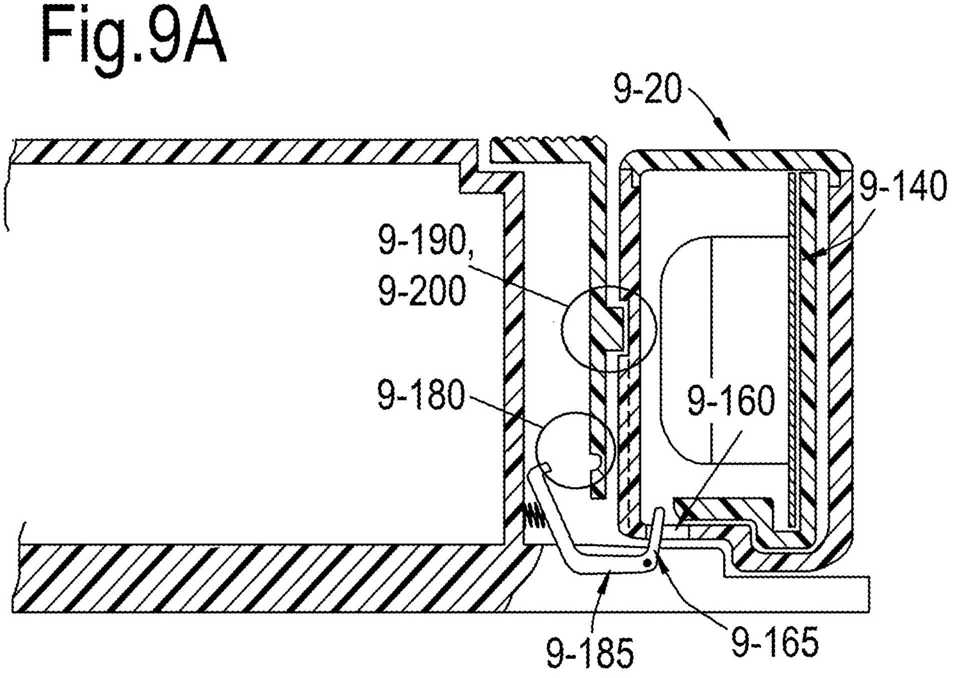
FIGS. 9A-9B schematically depict still further embodied locking mechanisms and their coordinated implementation in an embodied blister pack dosage form container of this invention and assembly with respect to a drug dispensing device.
Figure 9B:
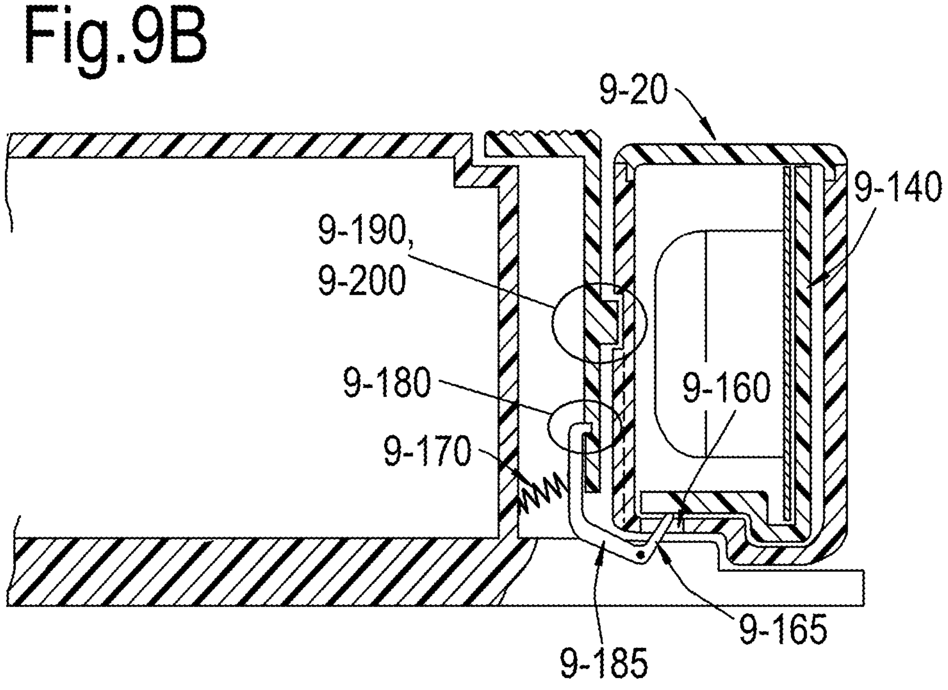

Another embodied blister pack dosage form container and its engagement with a drug dispenser is shown in FIGS. 9A-9B. Referring to FIG. 9A, the blister pack dosage form outer container 9-20 is depicted, which outer container is further modified to contain a penetrable channel 9-160, which in turn may be engaged by a lockable mechanism 9-185. According to this aspect, the drug dispenser may be further fitted with a lockable adapter 9-210, which contains a lockable mechanism 9-190, which engages an appropriate channel 9-200 on the blister pack dosage form outer container 9-20. In this aspect, engagement of the locking mechanism 9-190 within the channel 9-200 on the blister pack dosage form outer container 9-20 serves to lock the blister pack dosage form container to the lockable adapter 9-210 and thereby locking same to the drug dispenser 9-130. Referring to FIG. 9A, in this portrayed aspect, the blister pack dosage form container is in the zero position, i.e. whereby dispensing the dosage form is prevented. As is evident, the terminal pin 9-165 of the lockable mechanism 9-185 inserts fully through the channel 9-160, accessing/abutting the blister pack tray 9-140 thereby also locking the blister pack tray 9-140 in place, within the dispenser so that the blister pack is not advanced to promote exposure of the dosage form to the access portal.

Referring to FIG. 9B, upon further activation of the device, for example, via rotation of a handle or constraining ring, the same in turn aligns the blister pack tray 9-140 more centrally, displacing the terminal pin 9-165 of the lockable mechanism 9-185, such that the terminal pin recedes from fully inserting through the channel 9-160. This in turn promotes lateral movement of the second terminal pin 9-180 of the lockable mechanism 9-185, such that the second terminal pin 9-180 inserts within an accommodating channel 9-210, and a locking spring 9-170 is released, applying pressure to the second terminal pin to promote a tight fit within the accommodating channel 9-210. The lateral displacement also enables regulated lateral advancement of the blister pack tray to promote successive dispensing of dosage forms located therein.

Figure 10A:
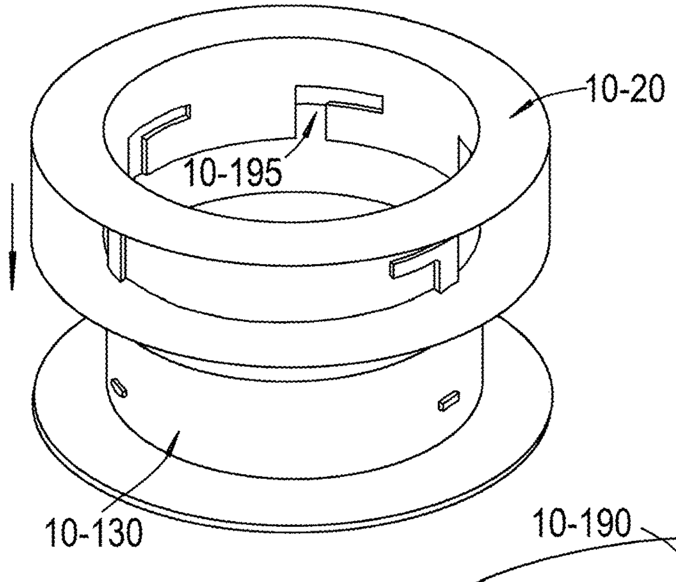
FIGS. 10A-10C schematically depict schematically depicts still further embodied locking mechanisms and their coordinated implementation in embodied lockable advanceable oral dosage form dispenser containers of this invention and assembly with respect to a drug dispensing device.
Figure 10B:
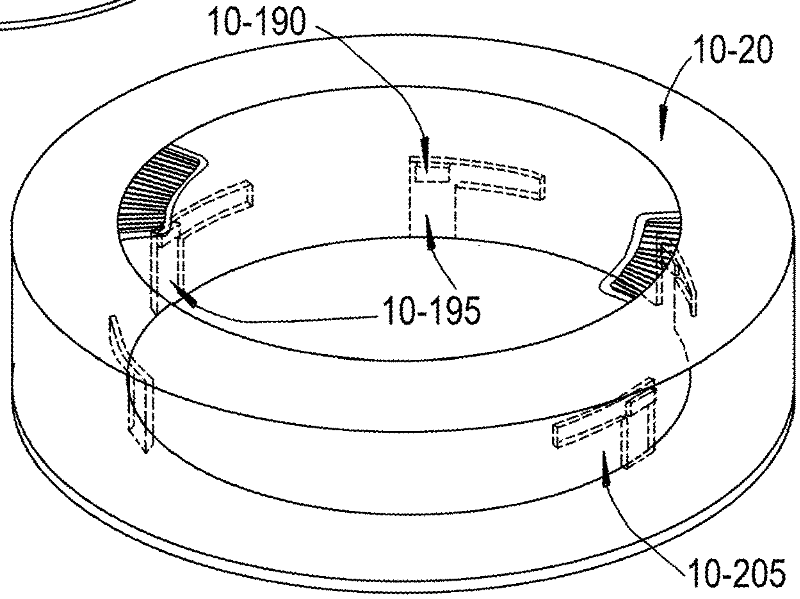
Figure 10C:
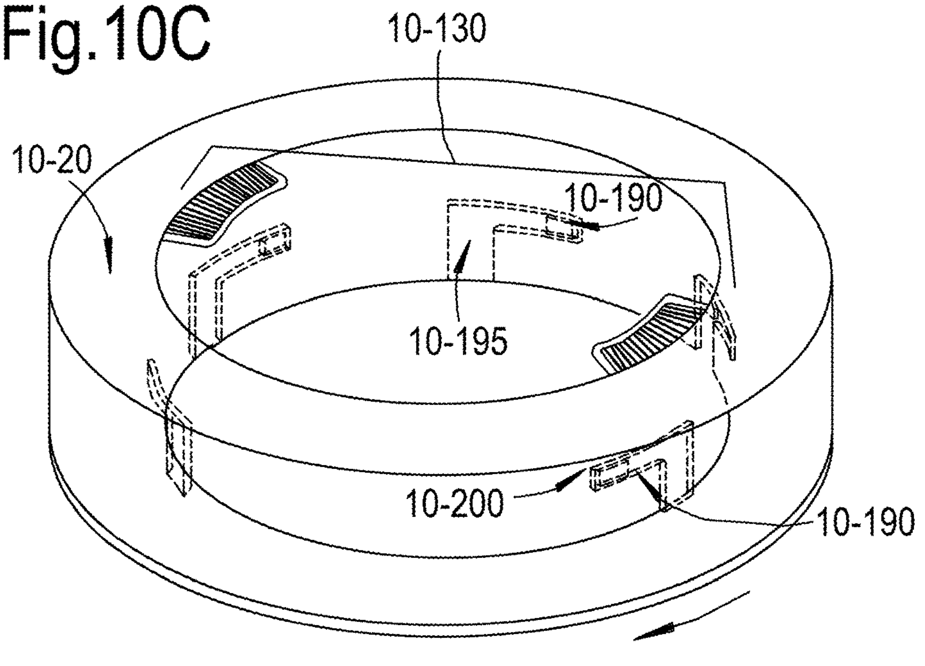

Referring to FIGS. 10A-10C, another embodiment of a locking mechanism element is depicted. According to this aspect, and in one embodiment, the blister pack dosage form container 10-20 is rendered transparent for ease of identification of various depicted locking parts.

According to this aspect, and in one embodiment, the drug dispensing device 10-130 may itself comprise a locking mechanism 10-190, which is engaged via channel 10-195 and rotated therewithin until reaching the final locked position 10-200.

In another embodiment, and as described in FIGS. 9A and 9B, the drug dispenser 10-130 may be further fitted with a lockable adapter, which contains a locking mechanism 10-190, which is engaged via channel 10-195 and rotated therewithin until reaching the final locked position 10-200.

In some aspects, the locking mechanism is rotated within the indicated channel 10-205, and in some aspects, such channel may be angled upward or downward. According to this aspect, and in some embodiments, the rotation of the locking mechanism within channel 10-205 to arrive in position 10-200 ensures that rotation of the outer container about its axis is uni-directional, and in a controlled, regulated manner.

While certain aspects of the locking mechanism have been depicted in the Figures, it will be clear to the skilled artisan that any appropriate locking mechanism, for example, a series of "locking pins" or spring-loaded rods, or other mechanisms may be used in a releasable manner such that engagement of same prevents lateral movement of the multi-sectioned dosage form holder, and release of same permits lateral movement of the multi-sectioned dosage form holder.

In some embodiments, the advanceable multi-sectioned dosage form holder further comprises a component of a reciprocating regulated dosage form advancing assembly, which component promotes advancement of said multi-sectioned dosage form holder to position successive dosage forms contained within said multi-dosage form containing container located within said holder in a regulated manner.

In some embodiments, the tamper proof blister pack dosage form container and/or the tamper proof multi-sectioned dosage form container is locked upon insertion and closure of said advanceable blister pack holder and/or multi-sectioned dosage form holder within said tamper proof, lockable blister pack dosage form outer container and/or multi-sectioned dosage form outer container, respectively.

In some aspects, the blister pack dosage form outer container and/or multi-sectioned dosage form outer container releasable locking mechanism element prevents advancement of said advanceable blister pack holder and/or multi-sectioned dosage form holder.

In some aspects, the releasable locking mechanism element is a portal providing access of a locking extension therethrough, upon incorporating a blister pack dosage form container and/or a multi-sectioned dosage form container within a regulated medication dispenser, such that advancement of advanceable blister pack holder or said multi-sectioned dosage form holder contained therein is prevented.

According to this aspect, and in some embodiments, the element is a movable locking extension, which may be engaged upon incorporating the blister pack dosage form container or multi-sectioned dosage form container within a regulated medication dispenser, such that advancement of advanceable blister pack holder or multi-sectioned dosage form holder contained therein is prevented.

In some embodiments, the multi-dosage form containing blister pack or multi-sectioned dosage form holder may comprise one or more dosage forms in a single blister of said blister pack or in a single compartment of the multi-sectioned holder. According to this aspect, and in some embodiments, the multi-dosage form containing blister pack or multi-sectioned dosage form holder may comprise one or more types of dosage forms in the blister pack or multi-sectioned dosage form holder.

In some embodiments, the blister pack dosage form outer container and/or multi-sectioned dosage form outer container is disposable and cannot be refilled.

In some embodiments, the blister pack dosage form outer container and/or multi-sectioned dosage form outer container cannot be opened once the advanceable blister pack holder and/or the advanceable multi-sectioned dosage form holder is placed and enclosed therewithin without use of a regulated refilling mechanism. According to this aspect, and in some embodiments, the regulated refilling mechanism is only provided to an authorized pharmacist or health care provider.

This invention provides a kit of parts for the regulated use of a blister pack dosage form container, comprising an advanceable blister pack holder, comprising a series of access portals sized to accommodate pass-through of at least one dosage form contained within a multi-dosage form containing blister pack located within said holder proximally therethrough upon engagement of an appropriate depilling structure.

According to this aspect, and in some embodiments, the kits further comprises a lockable blister pack dosage form outer container, comprising:

- a casing within which the advanceable blister pack holder is contained;
- one or two access portals sized to accommodate pass-through of at least one dosage form and to align with at least one of said series of access portals in said advanceable blister pack holder;
- optionally at least one releasable locking mechanism element; and
- at least one access port for accessing an element promoting regulated advancement of the advanceable blister pack holder.

According to this aspect, and in some embodiments, the kit components are assembled into a blister pack dosage form container by an authorized pharmacist or health care provider. According to this aspect, and in some embodiments, either of the advanceable blister pack holder or lockable blister pack dosage form outer container is packaged separately.

This invention provides a kit of parts for the regulated use of a multi-dosage form container, comprising an advanceable multi-sectioned dosage form holder, comprising a series of access portals sized to accommodate pass-through of at least one dosage form contained within a advanceable multi-sectioned dosage form holder proximally therethrough upon engagement of an appropriate egress structure.

According to this aspect, and in some embodiments, the kit further comprises a lockable multi-dosage form outer container, comprising:

- a casing within which the advanceable multi-dosage form holder is contained;
- one or two access portals sized to accommodate pass-through of at least one dosage form and to align with at least one of said series of access portals in said advanceable multi-dosage form holder;
- optionally at least one releasable locking mechanism element; and
- at least one access port for accessing an element promoting regulated advancement of the advanceable multi-dosage form holder.

According to this aspect, and in some embodiments, the kit components are assembled into a multi-dosage form container by an authorized pharmacist or health care provider. According to this aspect, and in some embodiments, either of the advanceable multi-dosage form holder or lockable multi-dosage form outer container is packaged separately.

It is understood that the above description of the embodiments of the present invention are for illustrative purposes only, and is not meant to be exhaustive or to limit the invention to the precise form or forms disclosed, as many modifications and variations are possible. Such modifications and variations are intended to be included within the scope of the present invention as defined by the accompanying claims.

It will be understood by those skilled in the art that various changes in form and details may be made therein without departing from the spirit and scope of the invention as set forth in the appended claims. Those skilled in the art will recognize, or be able to ascertain using no more than routine experimentation, many equivalents to the specific embodiments of the invention described herein. Such equivalents are intended to be encompassed in the scope of the claims.

All publications, patents, and patent applications mentioned herein are hereby incorporated by reference in their entirety as if each individual publication or patent was specifically and individually indicated to be incorporated by reference. In case of a conflict between the specification and an incorporated reference, the specification shall control. Where number ranges are given in this document, endpoints are included within the range. Furthermore, it is to be understood that unless otherwise indicated or otherwise evident from the context and understanding of one of ordinary skill in the art, values that are expressed as ranges can assume any specific value or subrange within the stated ranges, optionally including or excluding either or both endpoints, in different embodiments of the invention, to the tenth of the unit of the lower limit of the range, unless the context clearly dictates otherwise. Where a percentage is recited in reference to a value that intrinsically has units that are whole numbers, any resulting fraction may be rounded to the nearest whole number.

In the claims articles such as "a,", "an" and "the" mean one or more than one unless indicated to the contrary or otherwise evident from the context. Claims or descriptions that include "or" or "and/or" between members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention also includes embodiments in which more than one, or all of the group members are present in, employed in, or otherwise relevant to a given product or process. Furthermore, it is to be understood that the invention provides, in various embodiments, all variations, combinations, and permutations in which one or more limitations, elements, clauses, descriptive terms, etc., from one or more of the listed claims is introduced into another claim dependent on the same base claim unless otherwise indicated or unless it would be evident to one of ordinary skill in the art that a contradiction or inconsistency would arise. Where elements are presented as lists, e.g. in Markush group format or the like, it is to be understood that each subgroup of the elements is also disclosed, and any element(s) can be removed from the group. It should it be understood that, in general, where the invention, or aspects of the invention, is/are referred to as comprising particular elements, features, etc., certain embodiments of the invention or aspects of the invention consist, or consist essentially of, such elements, features, etc. For purposes of simplicity those embodiments have not in every case been specifically set forth in haec verba herein. Certain claims are presented in dependent form for the sake of convenience, but Applicant reserves the right to rewrite any dependent claim in independent format to include the elements or limitations of the independent claim and any other claim(s) on which such claim depends, and such rewritten claim is to be considered equivalent in all respects to the dependent claim in whatever form it is in (either amended or unamended) prior to being rewritten in independent format.

What is claimed is:

1. A blister pack dosage form container, comprising:

i) an advanceable blister pack holder, comprising a series of access portals sized to accommodate pass-through of at least one dosage form contained within a multi-dosage form containing blister pack located within said holder proximally therethrough upon engagement of a depilling structure, wherein said advanceable blister pack holder accommodates upright positioning of said dosage forms and said depilling structure displaces said dosage form laterally; and ii) a lockable blister pack dosage form outer container, comprising a tamper proof casing within which said advanceable blister pack holder is contained, wherein the lockable blister pack dosage form outer container further comprises:

at least one access portal sized to accommodate pass-through of at least one dosage form and to align with at least one of said series of access portals in said advanceable blister pack holder;

at least one access port for accessing an element regulated advancement of said advanceable blister pack holder; and the advanceable blister pack holder further comprising:

at least one releasable locking mechanism element;

at least one adapted region comprising an access port for receiving a lockable extension allowing regulated advancement of said advanceable blister pack holder, wherein said releasable locking mechanism element prevents advancement of said advanceable blister pack holder, wherein said access port of said adapted region provides access of a lockable extension therethrough, upon incorporating said multi-dosage form containing blister pack within a regulated medication dispenser containing a central adapter key comprising a plurality of said lockable extensions about the outer periphery of the central adapter key, such that advancement of said advanceable blister pack holder contained therein is prevented until said lockable extensions are received through said access port of said adapted region.

2. A kit of parts for the regulated use of a blister pack dosage form container, said kit of parts comprising the blister pack dosage form container according to claim 1.

3. The blister pack dosage form container of claim 1, wherein said tamper proof, lockable blister pack dosage form outer container is disposable and cannot be refilled.

4. The blister pack dosage form container according to claim 1, wherein said advanceable blister pack holder further comprises a component of a reciprocating regulated dosage form advancing assembly, the component allows advancement of said blister pack holder to position successive dosage forms contained within said multi-dosage form containing blister pack located within said holder in a regulated manner.

5. The blister pack dosage form container according to claim 4, wherein said component of a reciprocating gear assembly is engaged with additional components of said reciprocating gear assembly via said at least one access port in said tamper proof, lockable blister pack dosage form outer container.

6. The blister pack dosage form container according to claim 1, wherein said advanceable blister pack holder comprises a first fitted extension, provides for an accommodated fit of at least a portion of an edge of a multi-dosage form containing blister pack.

7. The blister pack dosage form container according to claim 6, wherein said tamper proof, lockable blister pack dosage form outer container comprises a second fitted extension, provides for an accommodated fit of said first fitted extension.

8. The blister pack dosage form container according to claim 1, wherein said advanceable blister pack holder accommodates positioning of said multi-dosage form containing blister pack in an upright position.

9. The blister pack dosage form container according to claim 1, wherein said multi-dosage form containing blister pack may comprise one or more dosage forms in a single blister of said blister pack.

10. The blister pack dosage form container according to claim 1, wherein said multi-dosage form containing blister pack may comprise one or more types of dosage forms in said blister pack.

11. The blister pack dosage form container according to claim 1, wherein said tamper proof blister pack dosage form container is locked upon insertion and closure of said advanceable blister pack holder within said tamper proof, lockable blister pack dosage form outer container.

12. The blister pack dosage form container according to claim 1, wherein said tamper proof, lockable blister pack dosage form outer container releasable locking mechanism element prevents advancement of said advanceable blister pack holder.

13. The releasable locking mechanism element according to claim 12, wherein said element is a portal providing access of a locking extension therethrough, upon incorporating said tamper proof blister pack dosage form container within a regulated medication dispenser, advancement of advanceable blister pack holder contained therein is prevented.

14. The releasable locking mechanism element according to claim 12, wherein said element is a movable locking extension, which may be engaged upon incorporating said tamper proof blister pack dosage form container within a regulated medication dispenser, advancement of advanceable blister pack holder contained therein is prevented.

15. The blister pack dosage form container of claim 1, wherein said tamper proof, lockable blister pack dosage form outer container can not be opened once said advanceable blister pack holder is placed and enclosed therewithin without use of a regulated refilling mechanism.

16. The blister pack dosage form container of claim 15, wherein said regulated refilling mechanism is only provided to an authorized pharmacist or health care provider.

17. A blister pack dosage form container, comprising:

i) an advanceable blister pack holder, comprising a series of access portals sized to accommodate pass-through of at least one dosage form contained within said blister pack holder proximally therethrough upon alignment with an egress structure, wherein said blister pack holder accommodates upright positioning of said dosage forms, said egress structure provides for lateral displacement of said at least one dosage form; and ii) a lockable outer container, comprising a tamper proof casing within which said blister pack holder is contained said egress structure is sized to accommodate pass-through of at least one dosage form and to align with at least one of said series of access portals in said advanceable blister pack holder; and the advanceable blister pack holder further comprising:

at least one releasable locking mechanism element; and at least one adapted region comprising an access port for receiving a plurality of lockable extensions disposed about the outer periphery of a central adapter key, allowing regulated advancement of said advanceable blister pack holder, wherein said releasable locking mechanism element prevents advancement of said advanceable blister pack holder, wherein said releasable locking mechanism element is movable, engaged upon incorporating said advanceable blister pack holder within said lockable outer container, such that advancement of said advanceable blister pack holder contained therein is prevented, unless said releasable locking mechanism element is released.

18. The blister pack dosage form container according to claim 17, wherein said blister pack dosage form container may comprise one or more dosage forms in a single compartment of said blister pack dosage form container.

19. The blister pack dosage form container according to claim 17, wherein said blister pack dosage form container may comprise one or more types of dosage forms in in a single compartment of said blister pack dosage form container.

20. The blister pack dosage form container according to claim 17, wherein said container is locked upon insertion and closure of said advanceable blister pack holder within said lockable outer container.

21. The blister pack dosage form container according to claim 17, wherein said outer container is disposable and cannot be refilled.

22. The blister pack dosage form container according to claim 17, wherein said lockable outer container cannot be opened once said blister pack holder is placed and enclosed therewithin without use of a regulated refilling mechanism.

23. The blister pack dosage form container according to claim 22, wherein said regulated refilling mechanism is only provided to an authorized pharmacist or health care provider.

24. A kit of parts for the regulated use of a blister pack dosage form container, said kit of parts comprising the blister pack dosage form container according to claim 17.

* * * * *